United States Patent
Pedretti et al.

(10) Patent No.: US 9,902,566 B2
(45) Date of Patent: Feb. 27, 2018

(54) CONVEYOR FOR AN ARTICLE HANDLING UNIT, IN PARTICULAR FOR A FOLDING UNIT FOR PRODUCING PACKAGES OF POURABLE FOOD PRODUCTS

(75) Inventors: Richard Pedretti, Casinalbo di Formigine (IT); Massimilliano Michelini, Modena (IT); Massimo Pradelli, Reggio Emilia (IT); Andrea Catellani, Modena (IT); Franco Santi, Modena (IT); Fabrizio Rimondi, Castel San Pietro Terme (IT); Alessandro Galata', Lund (IT)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 1072 days.

(21) Appl. No.: 14/127,613

(22) PCT Filed: Sep. 5, 2012

(86) PCT No.: PCT/EP2012/067243
§ 371 (c)(1),
(2), (4) Date: Jan. 24, 2014

(87) PCT Pub. No.: WO2013/064289
PCT Pub. Date: May 10, 2013

(65) Prior Publication Data
US 2014/0223858 A1 Aug. 14, 2014

(30) Foreign Application Priority Data
Oct. 31, 2011 (EP) .................................... 11187350

(51) Int. Cl.
*B65G 47/24* (2006.01)
*B65G 47/244* (2006.01)
(Continued)

(52) U.S. Cl.
CPC .............. *B65G 47/24* (2013.01); *B65B 11/00* (2013.01); *B65B 35/58* (2013.01); *B65B 43/52* (2013.01); *B65G 47/244* (2013.01)

(58) Field of Classification Search
None
See application file for complete search history.

(56) References Cited

U.S. PATENT DOCUMENTS 3,797,889 A * 3/1974 Wilkinson ........... B65G 47/244
198/380
3,890,508 A * 6/1975 Sharp ........................ B28D 7/04
198/394

(Continued)

FOREIGN PATENT DOCUMENTS

CN 101180218 A 5/2008
EP 0372314 A1 6/1990

(Continued)

OTHER PUBLICATIONS

Office Action (Notice of Reasons for Rejection) dated May 30, 2016, by the Japanese Patent Office in corresponding Japanese Patent Application No. 2014-537531, and an English translation of the Office Action. (9 pgs).

(Continued)

*Primary Examiner* — Kavel Singh
(74) *Attorney, Agent, or Firm* — Buchanan Ingersoll & Rooney PC

(57) ABSTRACT

There is described a conveyor for an article handling unit, comprising an endless transport element fed with a plurality of articles at an input station and advancing the articles along a handling path to an output station; the transport element is formed by a plurality of modules, each comprising a supporting member adapted to receive in use a relative article to be handled; each module further comprises a rotating element mounted in a rotatable manner onto the supporting (Continued)

member to produce a change of orientation of the relative article before to release it at the output station.

18 Claims, 19 Drawing Sheets

(51) Int. Cl.
*B65G 47/00* (2006.01)
*B65B 35/58* (2006.01)
*B65B 43/52* (2006.01)
*B65B 11/00* (2006.01)

(56) References Cited

U.S. PATENT DOCUMENTS

| | | | |
|---|---|---|---|
| 5,027,585 A | 7/1991 | Russell | |
| 5,141,388 A | 8/1992 | Nikolaos et al. | |
| 5,261,520 A | 11/1993 | Duke | |
| 5,836,139 A * | 11/1998 | Yoshida | B65B 7/16 53/387.3 |
| 5,966,899 A * | 10/1999 | Fontanazzi | B65B 7/20 53/374.7 |
| 6,109,420 A | 8/2000 | Poppi et al. | |
| 6,435,332 B1 | 8/2002 | Price | |
| 2007/0000206 A1 | 1/2007 | Berger et al. | |
| 2008/0304950 A1 | 12/2008 | Persson | |
| 2009/0113848 A1 | 5/2009 | Santi | |
| 2014/0123595 A1 | 5/2014 | Pedretti et al. | |
| 2014/0131173 A1 | 5/2014 | Pedretti et al. | |
| 2014/0194267 A1 | 7/2014 | Pradelli | |
| 2014/0196417 A1 | 7/2014 | Galata | |
| 2014/0223858 A1 | 8/2014 | Pedretti et al. | |
| 2014/0228193 A1 | 8/2014 | Pradelli et al. | |

FOREIGN PATENT DOCUMENTS

| | | |
|---|---|---|
| EP | 1 697 214 A1 | 9/2007 |
| JP | 2008-540280 A | 11/2008 |
| RU | 2061639 C1 | 6/1996 |
| WO | WO 2004/110905 A1 | 12/2004 |
| WO | WO 2005/058703 A1 | 6/2005 |
| WO | 20060122962 A1 | 11/2006 |

OTHER PUBLICATIONS

Notification of the First Office Action dated Aug. 27, 2014, by the State Intellectual Property Office of The People's Republic of China in Chinese Patent Application No. 201280032824.6, and an English translation of the Office Action. (15 pages).
U.S. Appl. No. 14/127,505, filed Feb. 11, 2014, Pedretti et al.
U.S. Appl. No. 14/127,503, filed Feb. 11, 2014, Pradelli.
U.S. Appl. No. 14/127,586, filed Jan. 24, 2014, Galata.
U.S. Appl. No. 14/127,506, filed Jan. 22, 2014, Pedretti et al.
U.S. Appl. No. 14/127,520, filed Jan. 22, 2014, Pedretti et al.
Office Action (Decision of Granting) dated May 4, 2016 by the Federal Service for Intellectual Property of Russia in corresponding Russian Patent Application No. 2014121992/13. (13 pgs).
International Search Report (PCT/ISA/210) dated Nov. 20, 2012, by the European Patent Office as the International Searching Authority for International Application No. PCT/EP2012/067243.

* cited by examiner

CONVEYOR FOR AN ARTICLE HANDLING UNIT, IN PARTICULAR FOR A FOLDING UNIT FOR PRODUCING PACKAGES OF POURABLE FOOD PRODUCTS

TECHNICAL FIELD

The present invention relates to a conveyor for an article handling unit, in particular for a folding unit for producing folded packages of pourable food products from relative sealed packs, to which the following description will explicitly refer without because of this loosing in generality.

BACKGROUND ART

As is known, many food products, such as fruit juice, pasteurized or UHT (ultra-high-temperature treated) milk, wine, tomato sauce, etc., are sold in packages made of sterilized packaging material.

A typical example of this type of package is the parallelepiped-shaped package for liquid or pourable food products known as Tetra Brik Aseptic (registered trademark), which is made by folding and sealing laminated strip packaging material.

The packaging material has a multilayer structure substantially comprising a base layer for stiffness and strength, which may comprise a layer of fibrous material, e.g. paper, or of mineral-filled polypropylene material; and a number of layers of heat-seal plastic material, e.g. polyethylene film, covering both sides of the base layer.

In the case of aseptic packages for long-storage products, such as UHT milk, the packaging material may also comprise a layer of gas- and light-barrier material, e.g. an aluminium foil or an ethyl vinyl alcohol (EVOH) foil, which is superimposed on a layer of heat-seal plastic material, and is in turn covered with another layer of heat-seal plastic material forming the inner face of the package eventually contacting the food product.

As is known, packages of this sort are produced on fully automatic packaging machines, on which a continuous tube is formed from the web-fed packaging material. The web of packaging material is sterilized on the packaging machine, e.g. by applying a chemical sterilizing agent, such as a hydrogen peroxide solution, which, once sterilization is completed, is removed from the surfaces of the packaging material, e.g. evaporated by heating. The web of packaging material so sterilized is maintained in a closed, sterile environment, and is folded and sealed longitudinally to form a vertical tube.

The tube is filled continuously downwards with the sterilized or sterile-processed food product, and is sealed and then cut along equally spaced cross sections to form pillow packs, which may be fed to a folding unit to form the finished packages.

More specifically, the pillow packs substantially comprise a main portion, and opposite top and bottom end portions tapering from the main portions towards respective top and bottom sealing bands which extend substantially orthogonal to the axis of the pack. In detail, each end portion is defined by a pair of respective trapezoidal walls which extend between main portion of the pack and the relative sealing band.

Each pillow pack also comprises, for each top and bottom end portion, an elongated substantially rectangular fin projecting from respective sealing bands; and a pair of substantially triangular flaps projecting from opposite sides of relative end portion and defined by respective trapezoidal walls.

The end portions are pressed towards each other by the folding unit to form flat opposite end walls of the pack, while at the same time folding the flaps of the top portion onto respective lateral walls of the main portion and the flaps of the bottom portion onto the bottom sealing band.

Packaging machines for producing packages of the above type are known, substantially comprising:
  an in-feed conveyor;
  a folding unit receiving the pillow packs from the in-feed conveyor and adapted to fold these pillow packs to form relative parallelepiped-shaped packages; and
  an out-feed conveyor which receives folded packages from the folding unit and moves them away from the packaging machine.

Folding units are known, for example from EP-B-0887261 in the name of the same Applicant, which typically comprise:
  an endless conveyor for feeding packs continuously along a forming path from a supply station to an output station;
  a number of folding devices arranged in fixed positions relative to the forming path and cooperating with packs to perform relative folding operations thereon;
  a heat-sealing device acting on respective triangular flaps of each pack to be folded, to melt the external layer of the packaging material and seal the flaps onto respective walls of the pack; and
  a pressing device cooperating with each pack to hold the triangular portions on respective walls as these portions cool.

In detail, the conveyor comprises an endless chain looped about and meshing with a driving sprocket and an idler wheel and formed by a plurality of links mutually connected by hinge pins at respective hinge points; the conveyor also comprises a tightener acting on the chain to maintain it at a constant tension.

The chain comprises a top straight branch, a bottom straight branch and two curved portions which are opposite to each other, respectively cooperate with the driving sprocket and the idler wheel and connect, on respective opposite sides, the top and bottom branches.

In order to perform the various folding operations, it is therefore necessary to have the packages in a given orientation while they move on the chain. However, this orientation is not suitable for the operations to which the packages will be subjected in the following handling unit located downstream of the folding unit.

It is therefore necessary to provide, between the folding unit and the following handling unit, a transfer unit provided with actuator means for changing the orientation of the packages during their transfer.

In practice, the packages have to be slowed down before interacting with the actuator means performing the change of orientation, and, after this operation, have to be speeded up so that the right pitch is achieved between one package and the following at the next handling unit.

In light of the above, the transfer unit represents an additional station to be manufactured, requiring its own motorizations to slow down and speed up the packages and its own synchronization means to arrange the packages at the right pitches when they interact with the actuator means for performing the change of orientation and when they enter the following handling unit.

Moreover, the operations of slowing down and speeding up the packages may have a negative impact on the package forming.

Last but not least, the transfer unit negatively affects the package production line performances and layout.

DISCLOSURE OF INVENTION

It is an object of the present invention to provide a conveyor for an article handling unit, designed to provide a straightforward, low-cost solution to the aforementioned drawbacks.

According to the present invention, there is provided a conveyor for an article handling unit, as claimed in claim 1.

BRIEF DESCRIPTION OF THE DRAWINGS

A preferred, non-limiting embodiment of the present invention will be described by way of example with reference to the accompanying drawings, in which:

FIG. 19 shows a larger-scale perspective view of a pack the folding unit of the previous Figures is fed with.

BEST MODE FOR CARRYING OUT THE INVENTION

Figure 1:
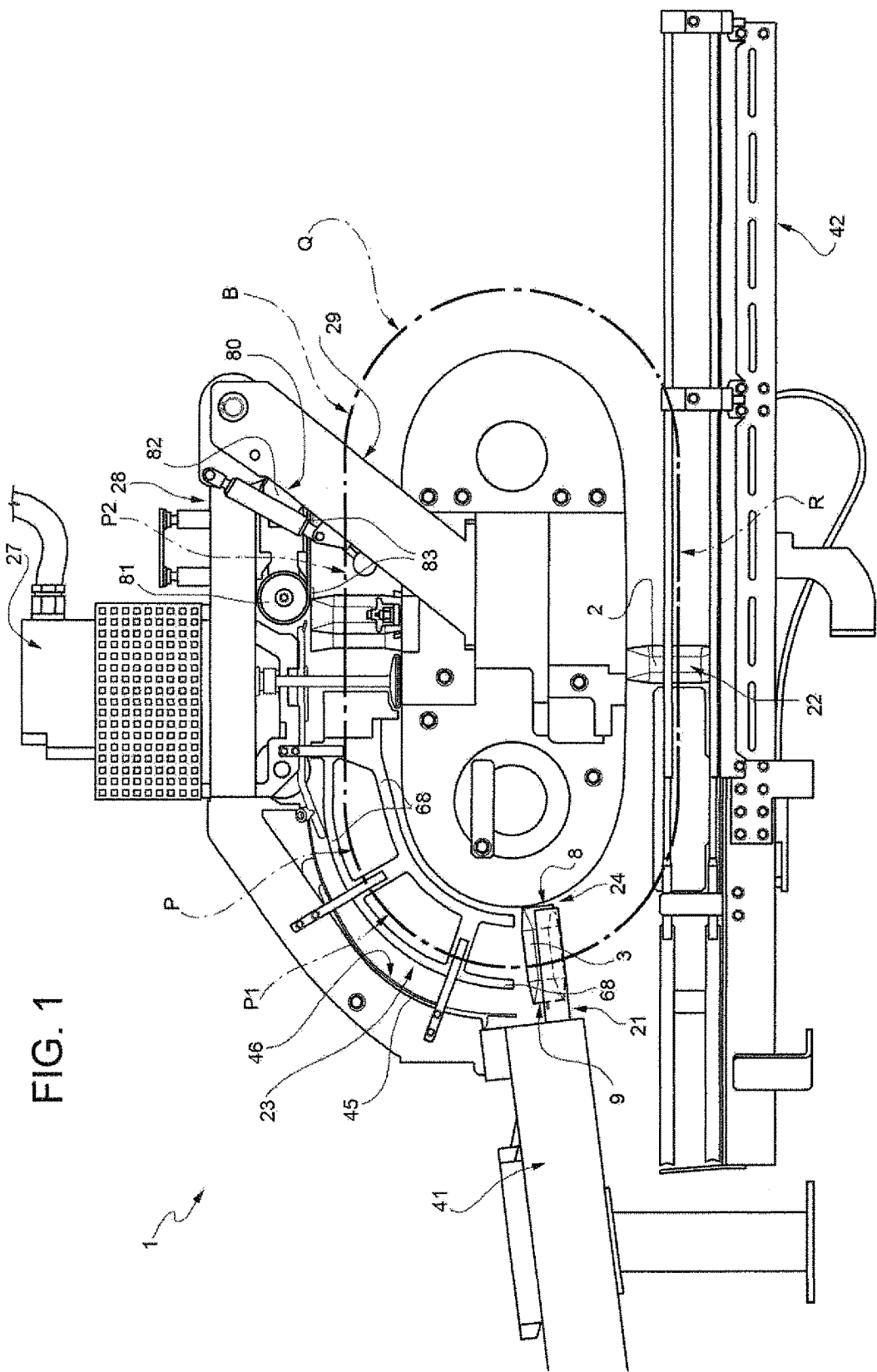
FIG. 1 shows a side view, with parts removed for clarity, of a folding unit for producing packages of pourable food products, provided with a conveyor in accordance with the present invention.

Number 1 in FIG. 1 indicates as a whole a folding unit for a packaging machine (not shown) for continuously producing sealed packages 2 of a pourable food product, such as pasteurized or UHT milk, fruit juice, wine, etc., from a known tube of packaging material (not shown).

The tube is formed in known manner upstream from unit 1 by longitudinally folding and sealing a known web (not shown) of heat-seal sheet material, which may comprise a base layer for stiffness and strength, which may be formed by a layer of fibrous material, e.g. paper, or of mineral-filled polypropylene material, and a number of layers of heat-seal plastic material, e.g. polyethylene film, covering both sides of the base layer. In the case of an aseptic package 2 for long-storage products, such as UHT milk, the packaging material may also comprise a layer of gas- and light-barrier material, e.g. an aluminium foil or an ethyl vinyl alcohol (EVOH) foil, which is superimposed on a layer of heat-seal plastic material, and is in turn covered with another layer of heat-seal plastic material forming the inner face of the package 2 eventually contacting the food product.

The tube of packaging material is then filled with the food product for packaging, and is sealed and cut along equally spaced cross sections to form a number of pillow packs 3 (FIG. 19), which are then transferred to unit 1 where they are folded mechanically to form respective packages 2.

Alternatively, the packaging material may be cut into blanks, which are formed into packages 2 on forming spindles, and packages 2 are filled with the food product and sealed. One example of this type of packages is the so-called "gable-top" package known by the trade name Tetra Rex (registered trademark).

In detail, pillow packs 3 are transferred to unit 1 by using an in-feed conveyor 41 (FIG. 1), which is described in more detail in the European application "Feeding unit and method for feeding sealed pillow packs of pourable food products to a folding unit", filed by the Applicant concurrently with the present invention.

Unit 1 also feeds folded package 2 to out-feed conveyor 42, shown in FIG. 1.

Figure 19:
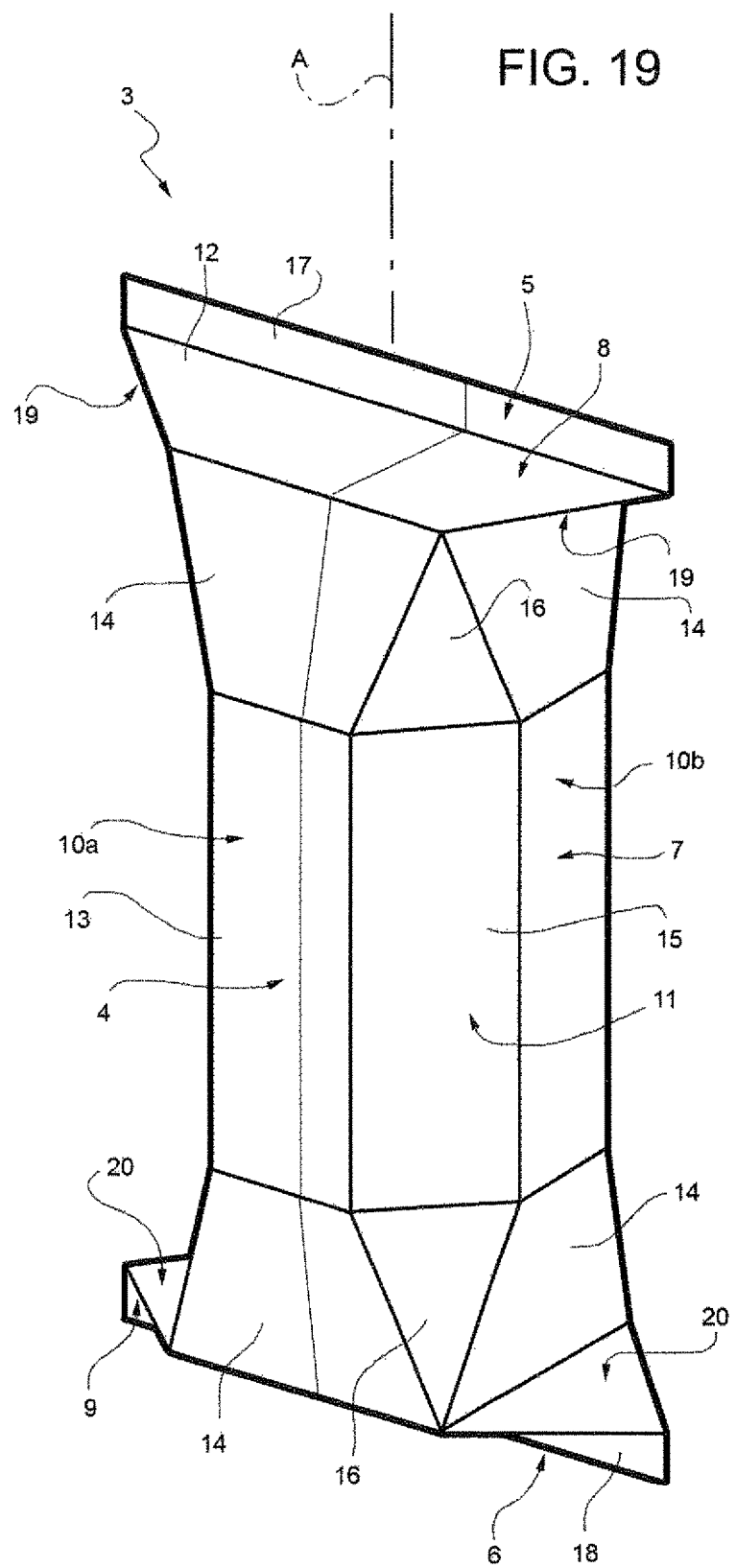

With reference to FIG. 19, an embodiment of a package 2 is shown which has a longitudinal sealing band 4, formed to produce the tube of packaging material from the web folded into a cylinder, extends along one side of each pack 3, which is closed at the opposite ends by respective transverse sealing bands 5, 6 perpendicular to and joined to longitudinal sealing band 4.

Each pack 3 has an axis A, and comprises a main body 7 and opposite, respectively top and bottom, end portions 8, 9 tapering from main body 7 towards respective transverse sealing bands 5, 6.

Main body 7 of each pack 3 is bounded laterally by four lateral walls 10a, 10b and four corner walls 11 alternate to each other, in the embodiment shown in FIG. 19.

Walls 10a (10b) are opposite to each other. In the very same way, walls 11 are opposite, in pairs, to each other.

Each wall 10a, 10b comprises a central rectangular stretch 13 and a pair of opposite, respective top and bottom, end stretches 14 which are interposed between stretch 13 and end portions 8, 9 of pack 3.

In detail, stretches 13 are substantially parallel to axis A. Each end stretch 14 is substantially in the form of an isosceles trapezium, and which slopes slightly relative to axis A, and has a major edge defined by respective end portions 8, 9.

Each wall 11 comprises a central rectangular stretch 15 and a pair opposite, respective top and bottom, end stretches 16 which are interposed between stretch 15 and end portions 8, 9 of pack 3.

In detail, stretches 15 are substantially parallel to axis A. Each end stretch 16 is substantially in the form of an isosceles triangle, which slopes slightly relative to axis A and converges from relative stretch 15 towards corresponding end portions 8, 9.

Each end portion 8, 9 is defined by two walls 12, each substantially in the form of an isosceles trapezium, which slope slightly towards each other with respect to a plane perpendicular to axis A, and have minor edges defined by respective end edges of portions 14 of respective wall 10a, and major edges joined to each other by respective sealing bands 5, 6.

Longitudinal sealing band 4 extends between transverse sealing bands 5 and 6, and along the whole of one wall 10a and the corresponding walls 12 on the same side as wall 10a.

Each pack 3 also comprises, for each end portion 8, 9, a respective substantially elongated rectangular end fin 17, 18 projecting in the direction of axis A from relative pack 3; and two substantially triangular flaps 19, 20 projecting laterally on opposite sides of main body 7 and defined by end portions of relative walls 12.

More precisely, each end fin 17, 18 extends along a direction orthogonal to axis A.

To form a package 2, unit 1 presses end portions 8, 9 of relative pack 3 down flat towards each other, and at the same time folds respective fins 17, 18 onto end portions 8, 9.

Furthermore, unit 1 folds flaps 20 onto top stretches 14 of respective walls 10b and folds flaps onto previously folded fin 17, on the opposite side of end portion 9.

Figure 2:
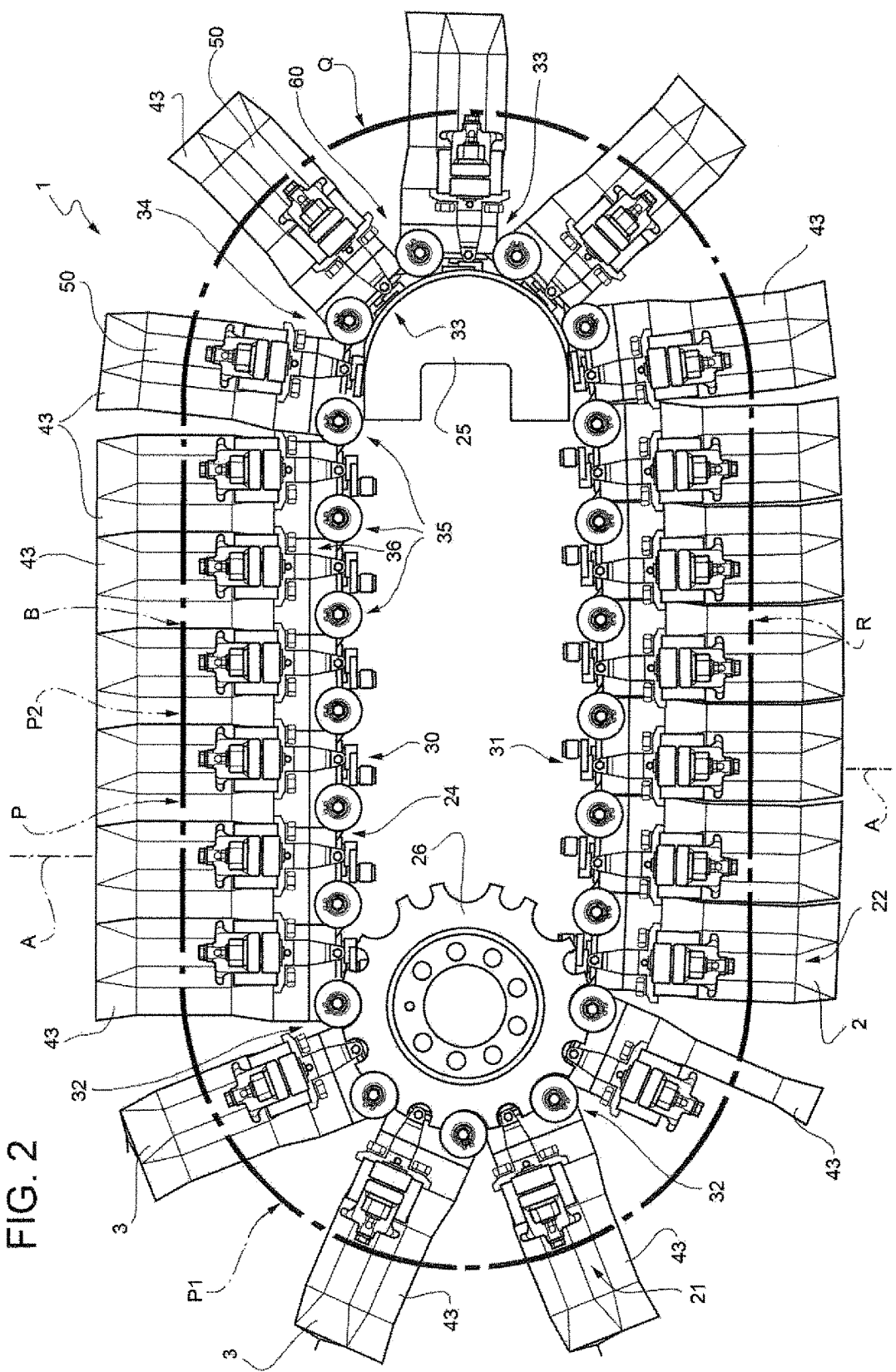
FIG. 2 is a larger-scale side view of the folding unit of FIG. 1, with parts removed for clarity.

With reference to FIGS. 1 and 2, unit 1 substantially comprises:
- a frame 29;
- an endless conveyor 34 for feeding packs 3 continuously along a forming path B from a supply station 21 to an output station 22 (both shown only schematically);
- folding means 23 which cooperate cyclically with each pack 3 to flatten end portion 8, fold relative fin 17 onto end portion 8, and fold flaps 19 onto previously flattened end portion 8 on the opposite side of end portion 9;
- folding means 24 for flattening end portion 9, folding relative fin 18 onto end portion 9 and bending flaps 20 towards axis A and end portion 9;
- a heating device 27 acting on bent flaps 19, 20 to melt the external layer of the packaging material and seal the flaps 19, 20 before they are pressed against end portion 8 and relative walls 10b respectively; and
- a pressing device 28 cooperating with each pack 3 to hold flaps 19 onto flattened fin 17 as flaps 19 cool.

Heating device 27 is, in particular, arranged between folding means 23 and pressure device 28 along forming path B.

With particular reference to FIGS. 2, 5, 6 and 7, conveyor 34 basically comprises an endless transport element, in the example shown a chain 60, formed by a plurality of mutually hinged rigid modules or links 35 and looped about a pair of coaxial driving sprockets 26 and a cam 25.

Chain 60 comprises a straight horizontal top branch 30, a bottom branch 31 substantially parallel to branch 30, and two curved C-shaped portions 32, 33, which are positioned with their concavities facing each other and connect branches 30 and 31; more specifically, C-shaped portion 32 cooperates with driving sprockets 26, whilst C-shaped portion 33 cooperates with cam 25.

Each link 35 comprises a substantially flat plate 36 adapted to receive a relative pack 3, and a paddle 43, which projects perpendicularly from plate 36 on the opposite side of driving sprockets 26 and cam 25 and which cooperates with and pushes a corresponding wall 10 of a relative pack 3 to feed it along path B.

Cam 25 is described in more detail in the European application "Folding unit for producing folded packages of pourable food products from relative sealed packs", filed by the Applicant concurrently with the present invention.

Figure 5:
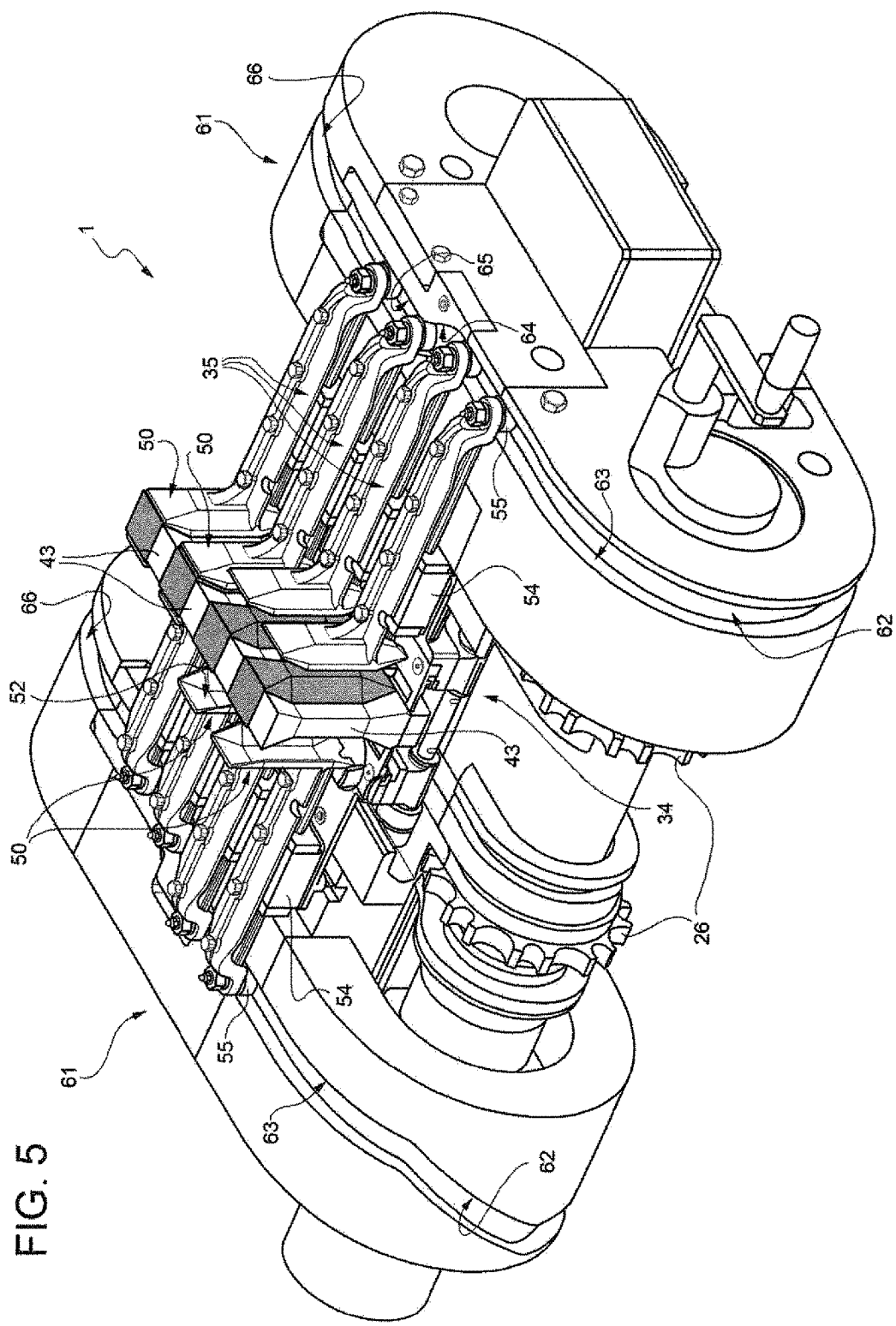
FIG. 5 shows a top perspective views, with parts removed for clarity, of the folding unit of FIG. 2.
Figure 6:
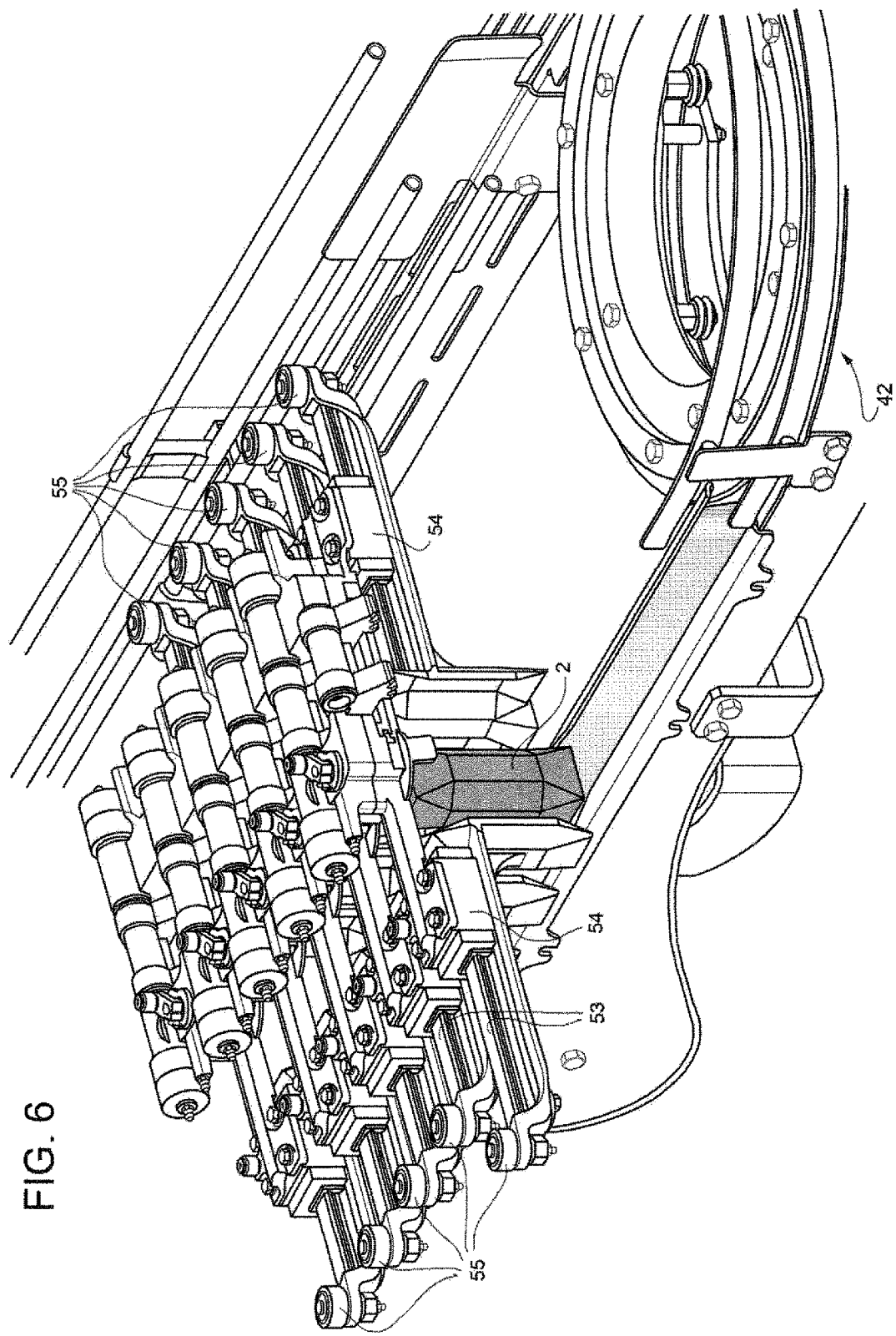
FIG. 6 shows a top perspective view, with parts removed for clarity, of the folding unit of FIGS. 1 to 5.
Figure 7:
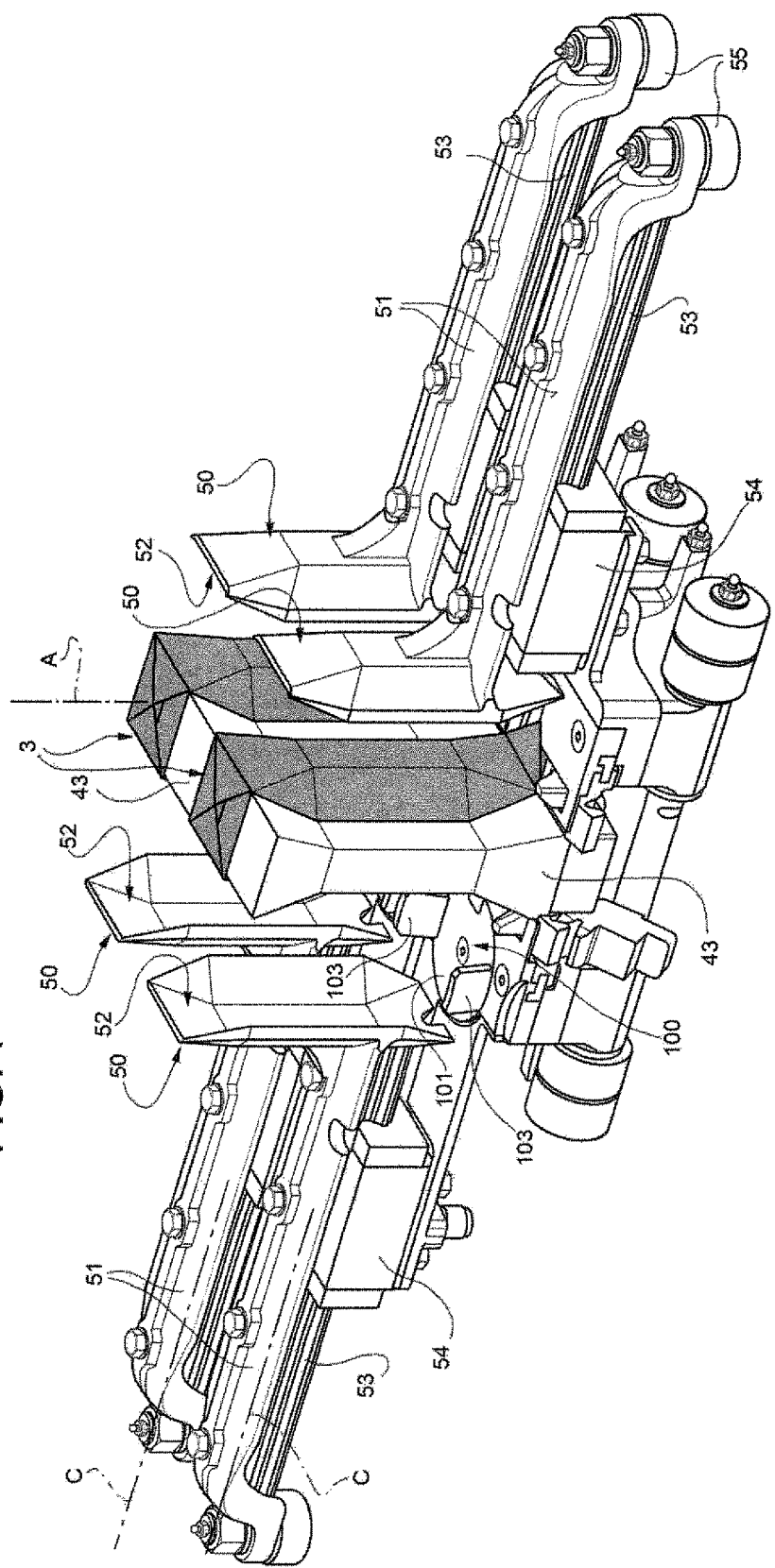
FIGS. 7 to 13 show some components of the folding unit of FIGS. 1 to 5 in different operative conditions.
Figure 8:
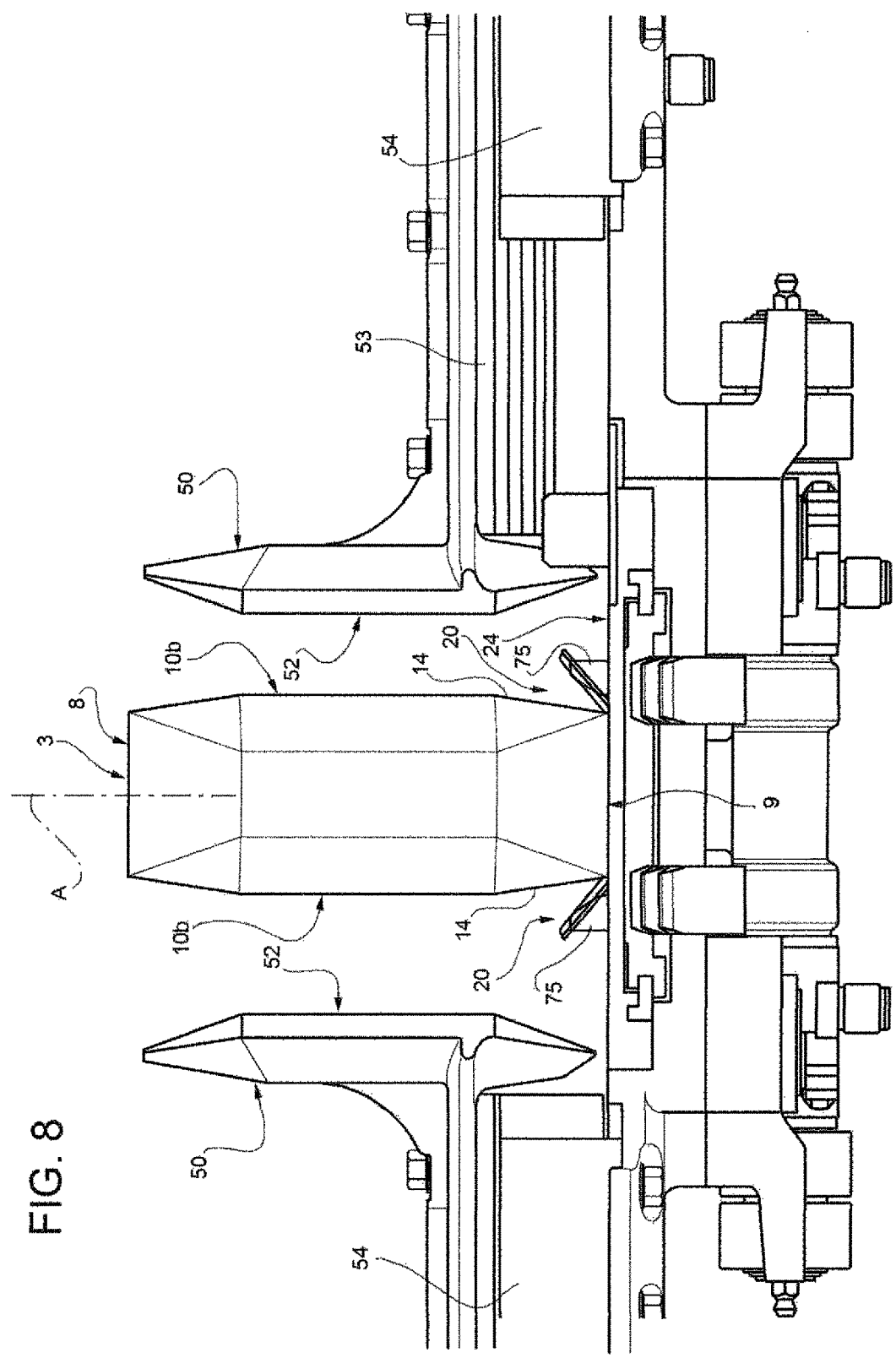

With reference to FIGS. 5 to 15, unit 1 further comprises a plurality of pairs of shells 50 which are integrally movable along path B and are movable along a direction C transversal to path B; shells 50 of each pair may be arranged in:
- a fully closed position in which they exert a pressure onto a relative pack 3, so as to complete a folding operation thereon; and
- an open position in which they are detached from folded package 2 (FIGS. 6 and 7).

Furthermore, shells 50 may be arranged also in a closed position, in which they grip folded package 2 but substantially do not exert any pressure thereon.

In detail, station 21 is defined by C-shaped portion 32 and station 22 is defined by bottom branch 31 in a position closer to C-shaped portion 32 than to C-shaped portion 33.

Path B comprises, proceeding from station 21 to station 22:
- a portion P starting from station 21, comprising a curved stretch P1 and a curved stretch P2, and along which packs 3 are folded into relative packages 2;
- a curved portion Q along which folded packages 2 are overturned of 180 degrees; and
- a straight portion R arranged downstream from curved portion Q and upstream from station 22.

In detail, stretch P1 is defined by a part of C-shaped portion 32 and stretch P2 is defined by top branch 30 of chain 60. Portion Q is defined by C-shaped portion 33, and portion R is defined by part of bottom branch 31 of chain 60.

Folding means 23 cooperate cyclically with each pack 3 along portion P.

Folding means 24 are defined by links 35 and, therefore, move together with chain 60 along path B.

Figure 9:
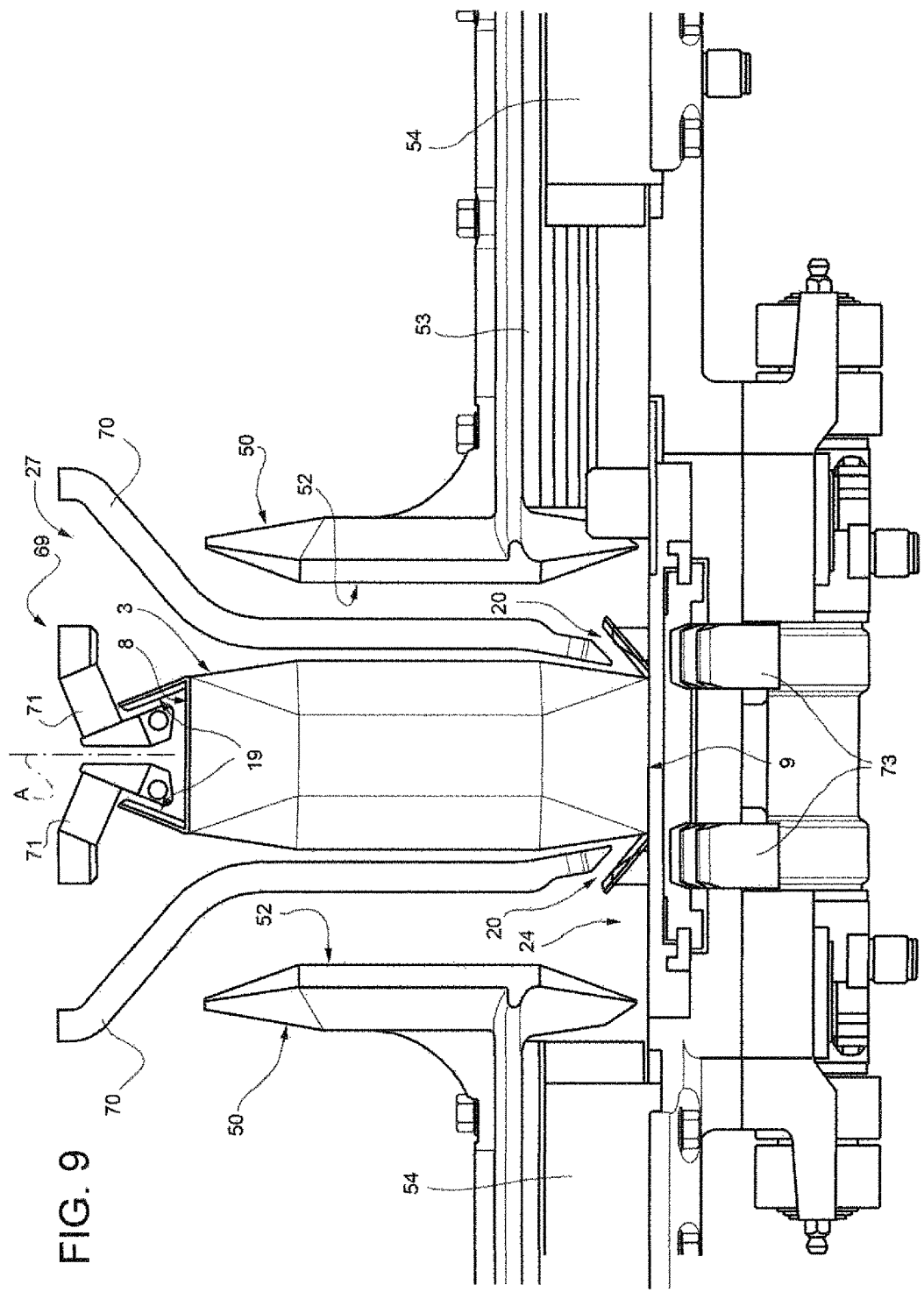

In detail, folding means 24 flatten end portion 9, folds relative fin 18 onto portion 9 and bend flaps 20 towards axis A and end portion 8, as relative pack 3 is carried along stretch P1 of path P (FIG. 9).

Figure 10:
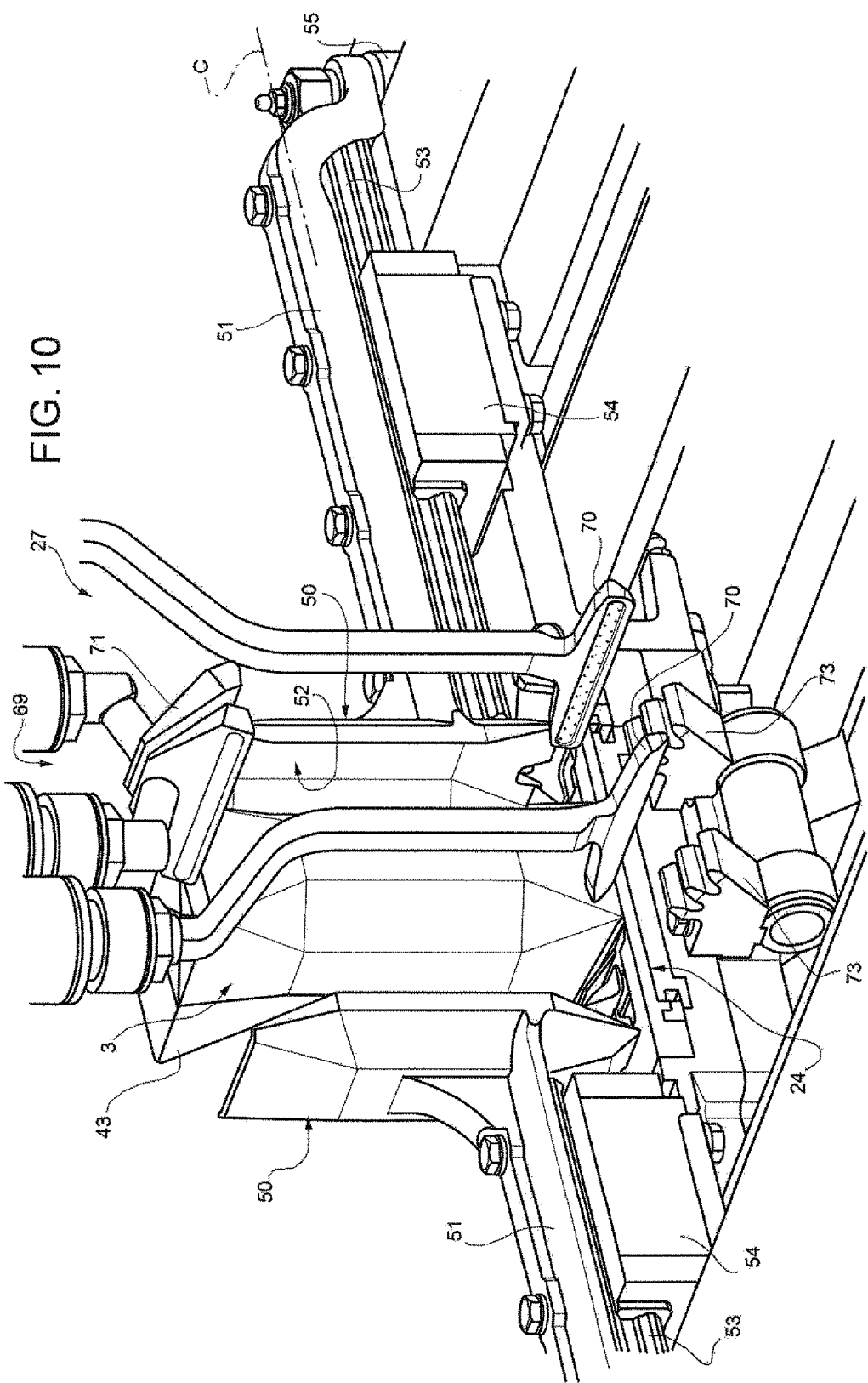
Figure 11:
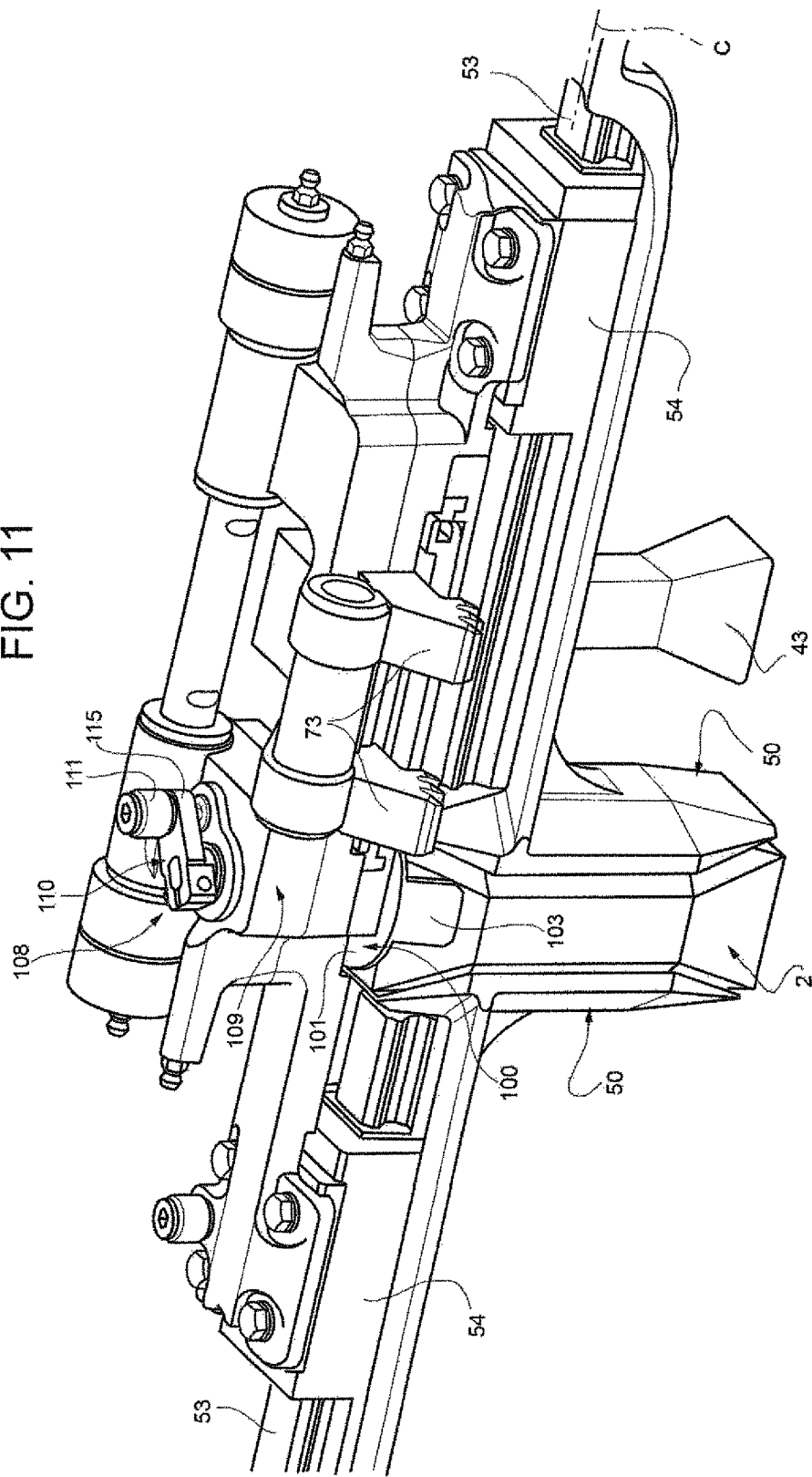
Figure 12:
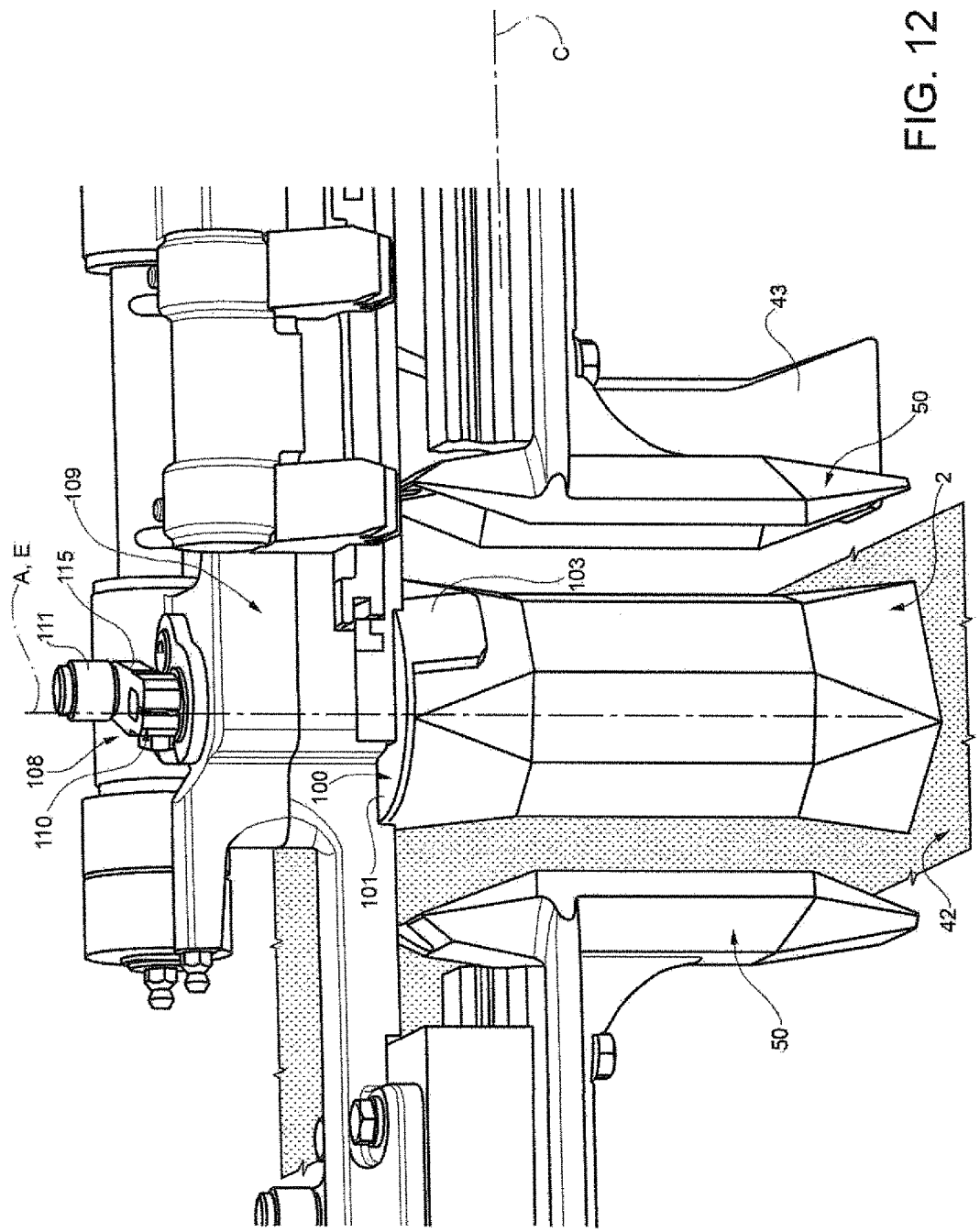
Figure 13:
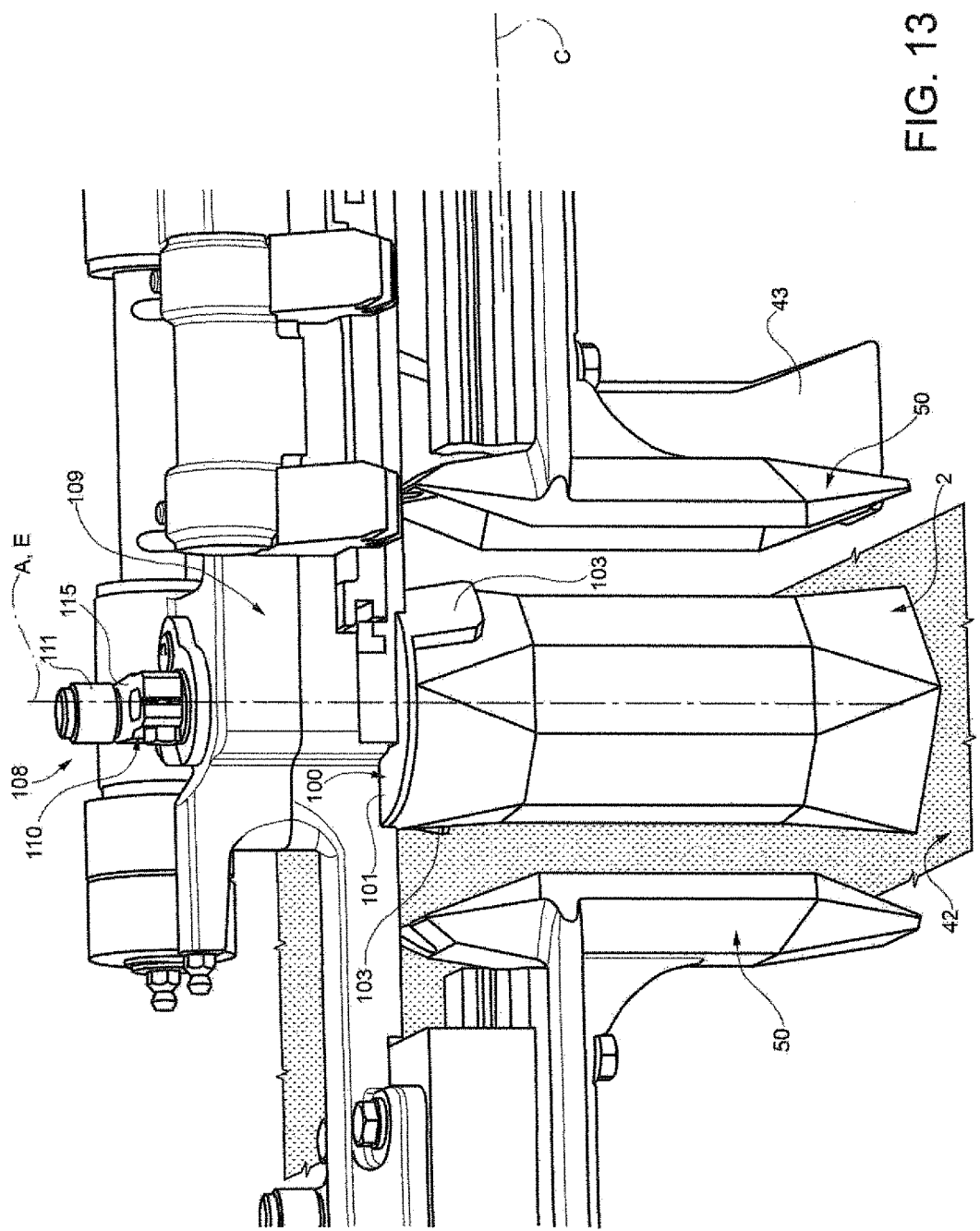

Heating device 27 acts on bent flaps 19, 20 to melt the external layer of the packaging material and seal the flaps 19, 20 before they are pressed against end portion 8 and relative walls 10b respectively, as pack 3 is carried along stretch P2 of portion P (FIG. 10).

In detail, shells 50 of each pair cyclically move according to the following work cycle.

Shells 50 of each pair are arranged in the open position at station 21, move from open to fully closed position along stretch P1 and an initial part of stretch P2, and reach the fully closed position along a remaining part of stretch P2. In the embodiment shown, shells 50 reach the fully closed position downstream from heating device 27 and upstream from pressing device 28, proceeding according to the advancing direction of chain 60.

When shells 50 are arranged into the fully closed position they exert a certain pressure on relative walls 10b and 11 adjacent thereto.

More precisely, as moving between the open and the fully closed position along stretch P2 of portion P, shells 50 of each link 35 perform two functions:
- firstly, they complete the bending of flaps 20 onto top stretches 14 of relative walls 10b; and
- then, they press flaps 20, which have been previously bent and heated, onto stretches 14 of relative walls 10b.

Furthermore, shells 50 of each pair move from the fully closed position into the closed position at the beginning of portion Q.

Along portion Q, shells 50 integrally move parallel to direction C and relative to respective paddle 43 (FIG. 7).

In the embodiment shown, shells 50 move away relative to each other for a distance for example of 2-4 mm, when they move from the fully closed position to the closed position.

In the following of the present description, only one link 35 will be described in detail, being clear that all links 35 are identical to each other.

Link 35 comprises (FIGS. 11 to 18):
- plate 36;
- paddle 43;
- a pair of shells 50 which may move relative to paddle 43 along direction C;

a pair of arms 51 connected to relative shells 50, elongated parallel to direction C and comprising each a relative slide 53; and a pair of guides 54 which extend on opposite sides of relative paddle 43 along direction C, and relative to which slides 53 move parallel to direction C.

Referring again to FIGS. 1 and 2, plate 36 is arranged below, and then supports, pack 3 (or package 2) along portion P and a starting stretch of portion Q of forming path B.

Conversely, plate 36 is arranged above package 2 along portion R of forming path B. Accordingly, folded package 2 is released, under the gravity action at station 22, to conveyor 42.

Shells 50 define, on their sides opposite to arm 51, relative surfaces 52 which are adapted to cooperate with pack 3 and which face each other.

Surfaces 52 mirror the lateral surface of packages 2 to be folded, so as to control the final shape of packages 2.

In the embodiment shown, each surface 52 mirrors a relative walls 10b and parts of relative walls 11.

Each arm 51 comprises, on its end opposite to relative shell 50, a roller 55.

Each slide 53 is arranged between relative shells 50 and rollers 55 of relative arm 51. Furthermore, each slide 53 may slide parallel to direction C relative to guide 54.

In the embodiment shown, each arm 51 is integral with relative shell 50.

Paddles 43 mirror the shape of walls 10 and of the part of relative walls 11 they cooperate with. Plate 36 of link 35 comprises (FIGS. 15 and 16):

a rectangular portion 37 from which paddle 43 protrudes; and a contoured portion 38 which surrounds portion 37.

Plate 36 of link 35 also defines:

a pair of through slots 39 which are arranged on opposite lateral sides of paddle 43 and elongated along a direction D tangent to forming path B and orthogonal to direction C;

a through slot 40 which is in communication with slots 39, is arranged downstream from slots 39 and portion 37 proceeding according to the advancing direction of chain 60, and which extends parallel to direction C.

Slots 39 are arranged on lateral sides of portion 37 and slots 39, 40 are defined between portions 37, 38.

Slots 39 extend, along direction D, between slot 40 and relative bridges 47 which integrally connect portions 36, 37.

Slot 40 extends parallel to direction C.

Folding means 24 comprises, for each link 35:

plate 36 which is integrally movable with paddle 43 along forming path B; and a C-shaped movable plate 72 which may move along direction D relative to paddle 43 and plate 36 between a first position (FIG. 15) in which it engages slot 40, so as to fold end fin 18 housed therein and a second position (FIG. 16) in which it leaves free slot 40.

In particular, slot 40 remains open when plate 72 is in the second position.

Link 35 also comprises a pair of toothed sectors staggered along relative direction C and which protrude from link 35 downstream from plate 36, proceeding according to the advancing direction of chain 60.

Plate 72 integrally comprises two arms 90 arranged on lateral sides of paddle 43, and a central element 91 interposed between arms 90.

Each arm 90 comprises a wedge 75 arranged on the side of paddle 43 and a rack 76 (FIG. 14) arranged on the side of driving sprockets 26 and cam 25.

Element 91 is housed within slot 40 when plate 72 is in the first position, and is arranged upstream from slot when plate 72 is in the second position.

In the embodiment shown, wedges 75 are triangular in cross section and converge towards a mid-direction of link 35.

Wedges 75 are arranged downstream from racks 76, proceeding according to an advancing direction of chain 60.

Figure 14:
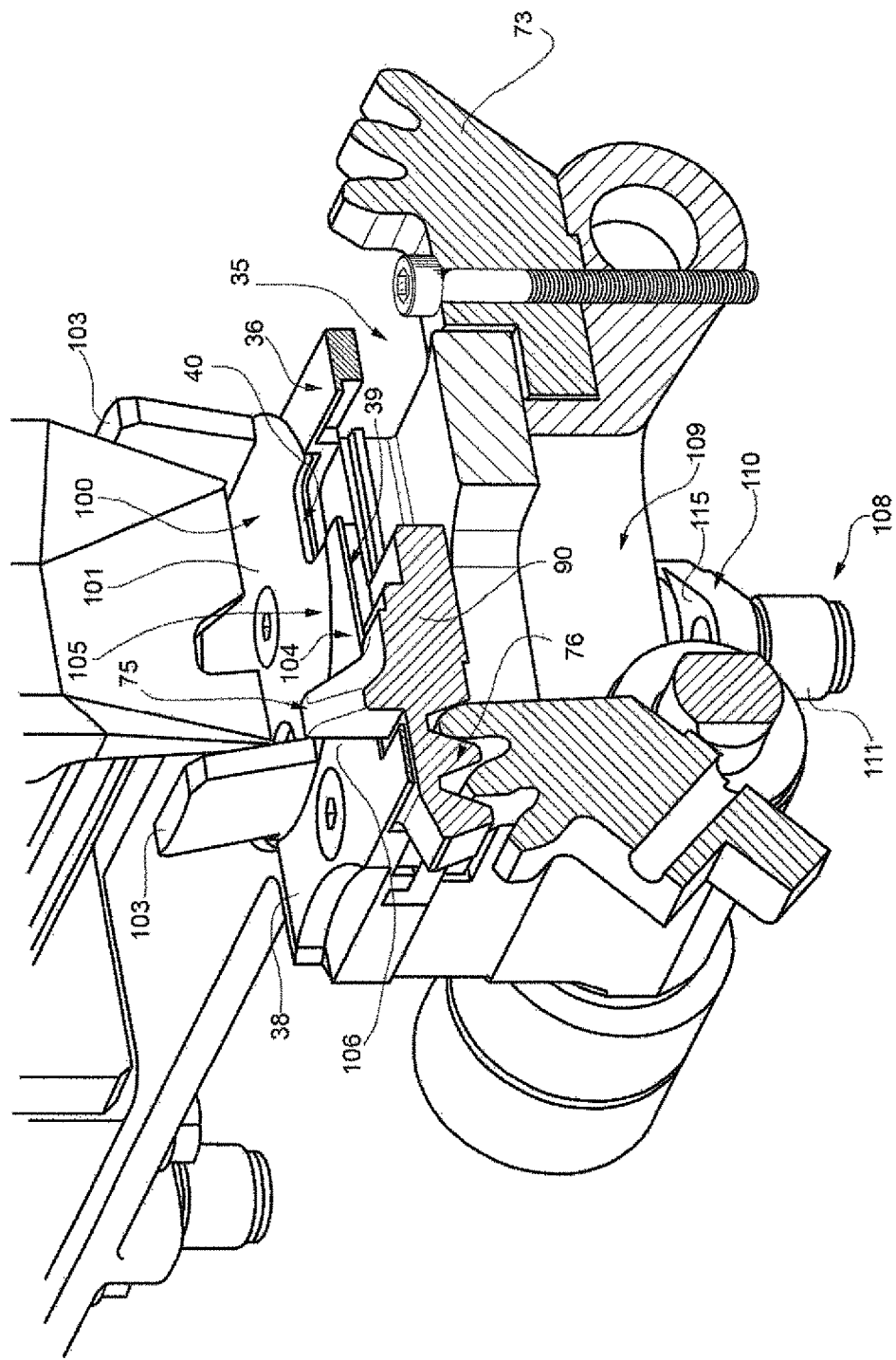
FIGS. 14 to 18 are perspective views of further components of the folding unit of FIGS. 1 to 5.
Figure 15:
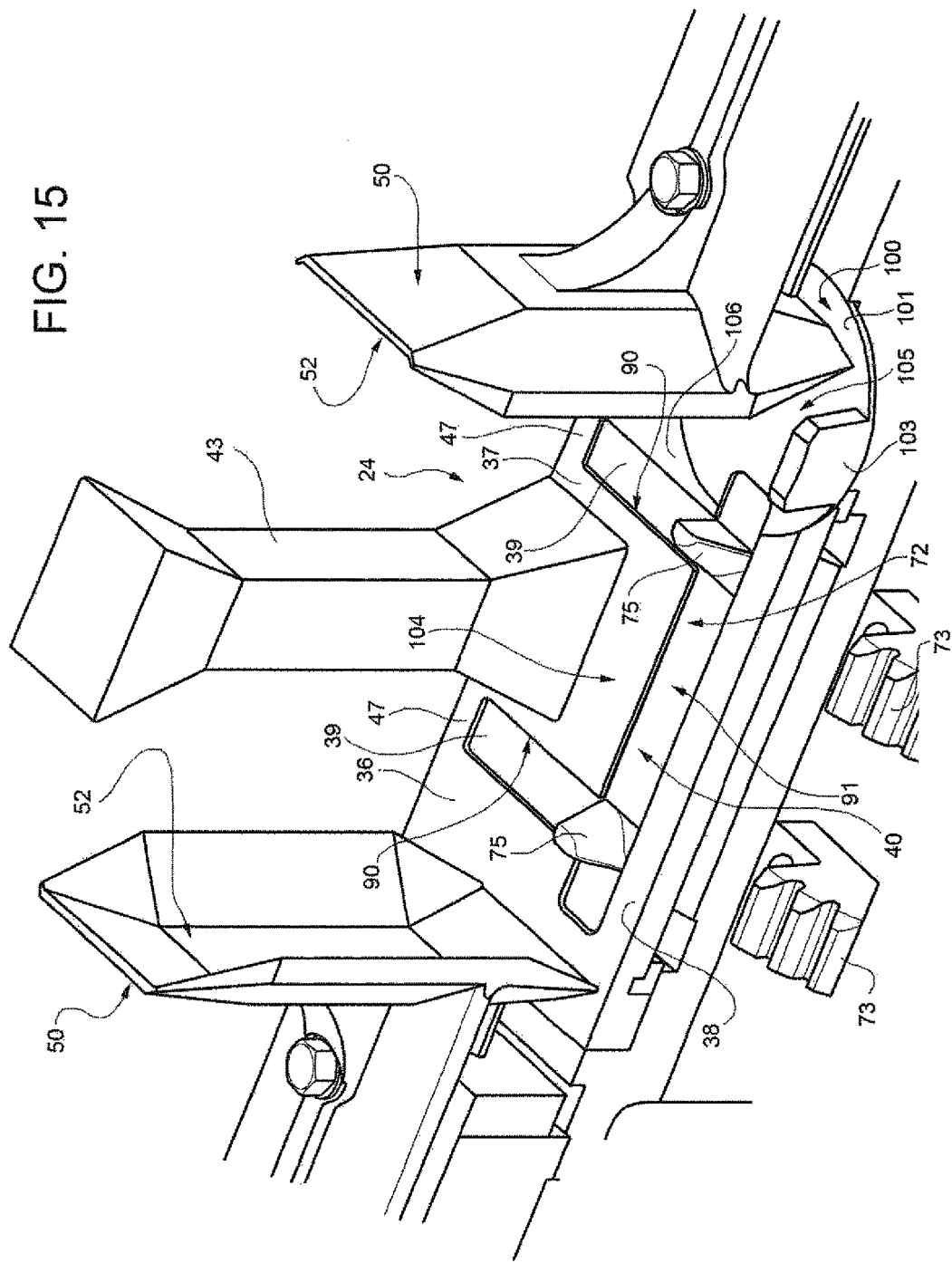
Figure 16:
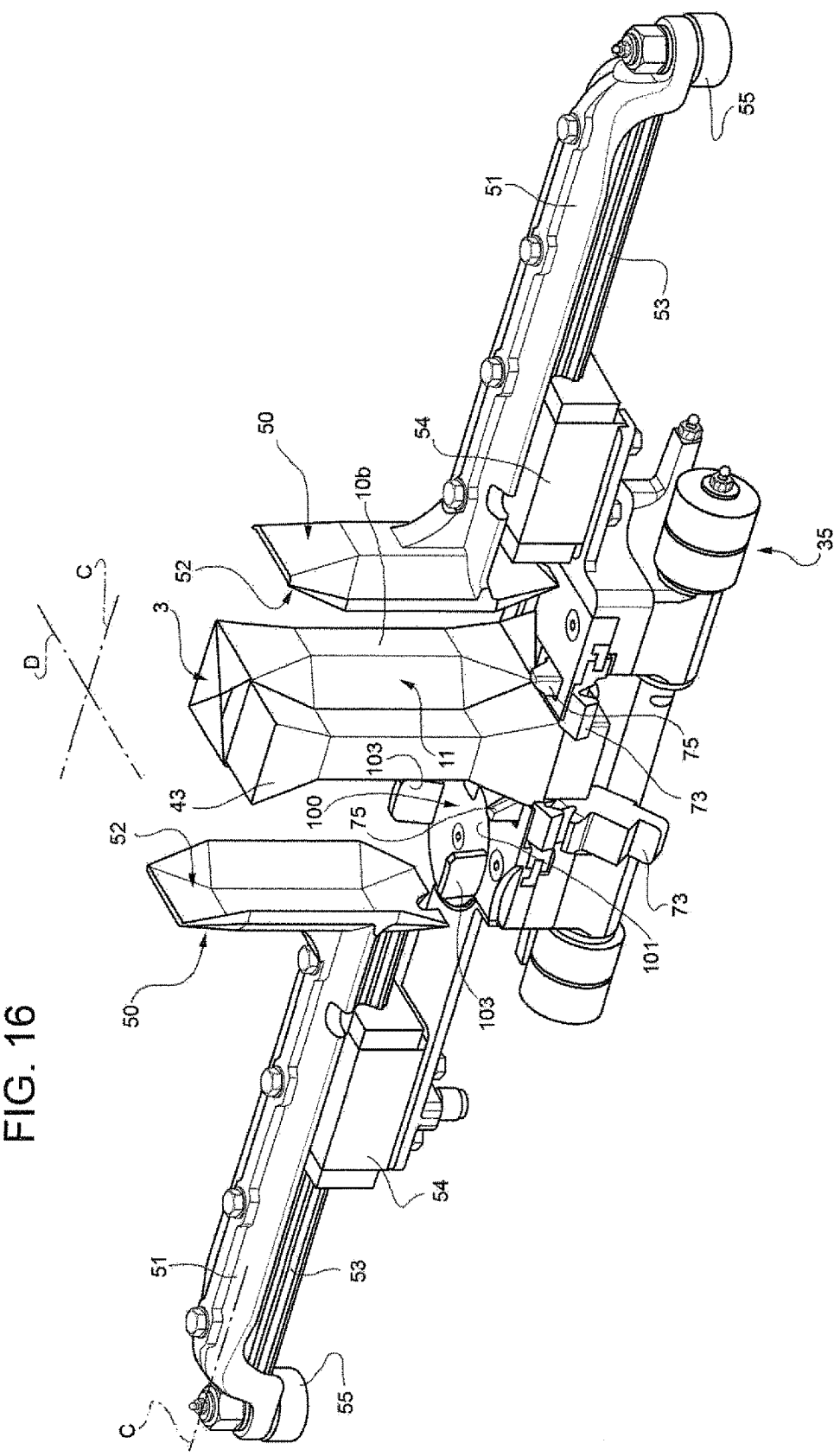
Figure 17:
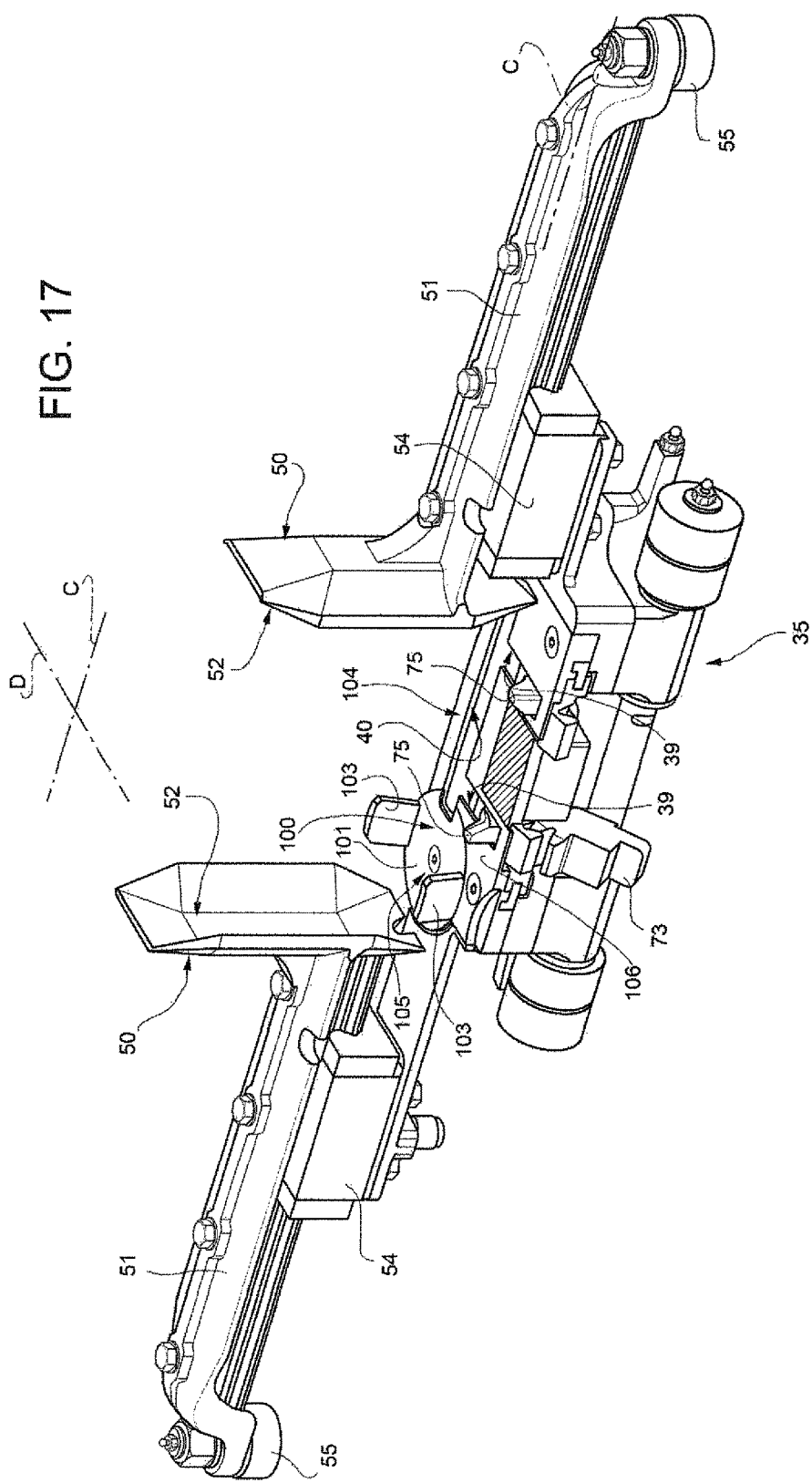
Figure 18:
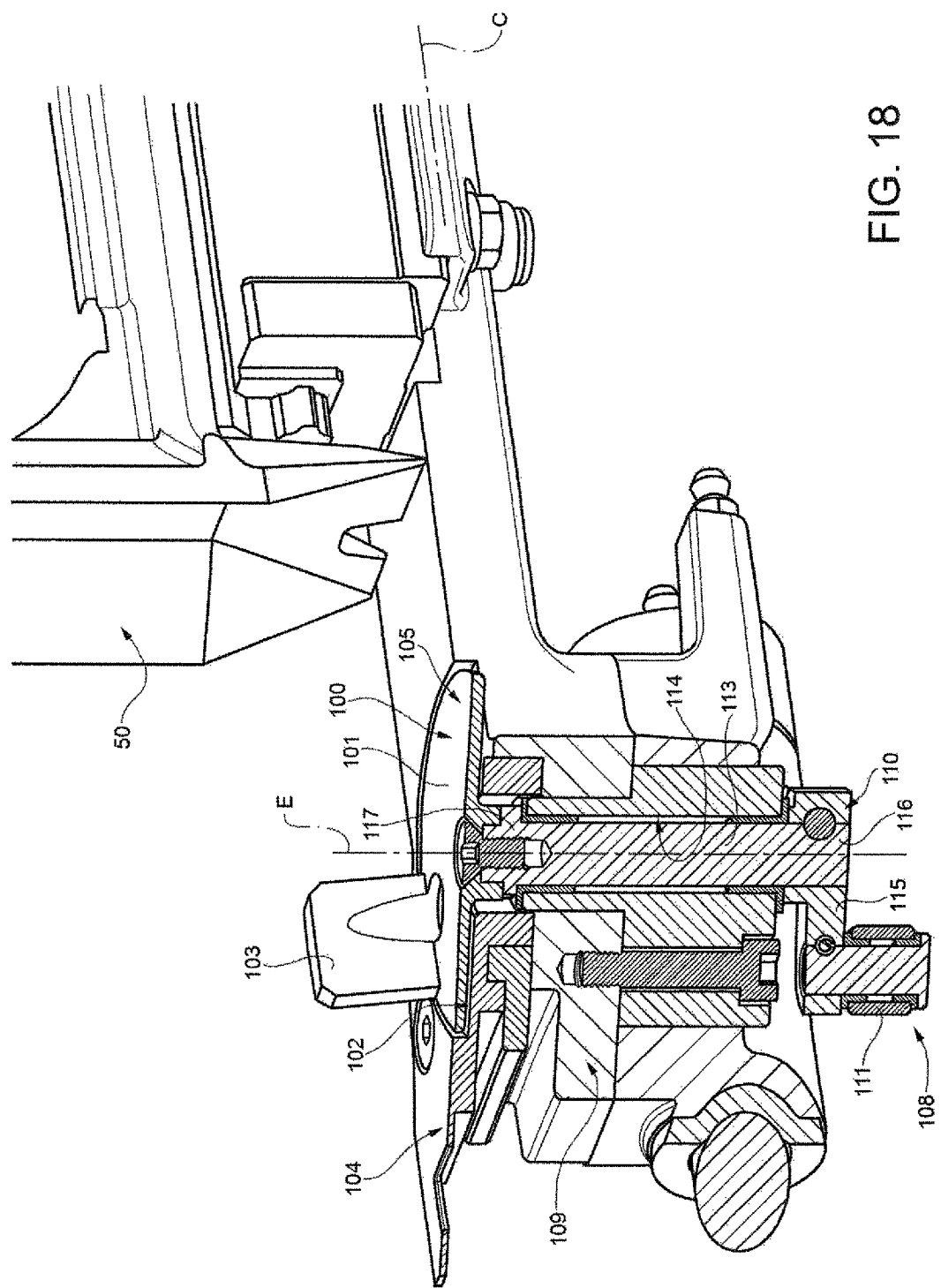

Toothed sectors 73 of each link 35 mesh with racks 76 of the following link 35 proceeding along the advancing direction of chain 60 (FIG. 14).

Plate 72 is arranged in the second position at station 21, moves from the second to the first position along stretch P1 of path B, remains in the first position along stretch P2 of path B, moves from the first to the second position along portion Q of path B, and remains in the second position along portion R of path B and from station 22 to station 21.

More precisely, fin 18 of pack 3 is arranged within open slot 40 of link 35 at station 21. When plate 72 of link 35 moves in the first position and engages slot 40, fin 18 is folded onto end portion 8. At the same time, wedges 75 raise flaps 20 towards end portion 8 and bend flaps 20 relative to axis A, up to when they reach the position shown in FIG. 9.

The corresponding shells 50, as moving from the open to the fully closed position, press flaps 20 against top stretches 14 of relative walls 12, downstream from folding means 23 and heating device 17, proceeding according to the advancing direction of chain 60.

Unit 1 also comprises a pair of cams 61 (FIGS. 3 to 5) adapted to control the movement of each pair of shells 50 between relative fully closed position, closed position and open position, as each pair of shells 50 advances along path B.

Furthermore, cams 61 also control the movement of each pair of shells 50 integrally to each other along direction C and relative to paddle 43 of corresponding link 35.

In detail, cams 61 are arranged on opposite lateral sides of chain 60.

One cam 61 comprises a groove 62 which is engaged by rollers 55 of first shells 50.

The other cam 61 comprises a further groove 62 which is engaged by rollers 55 of second shells 50.

Figure 3:
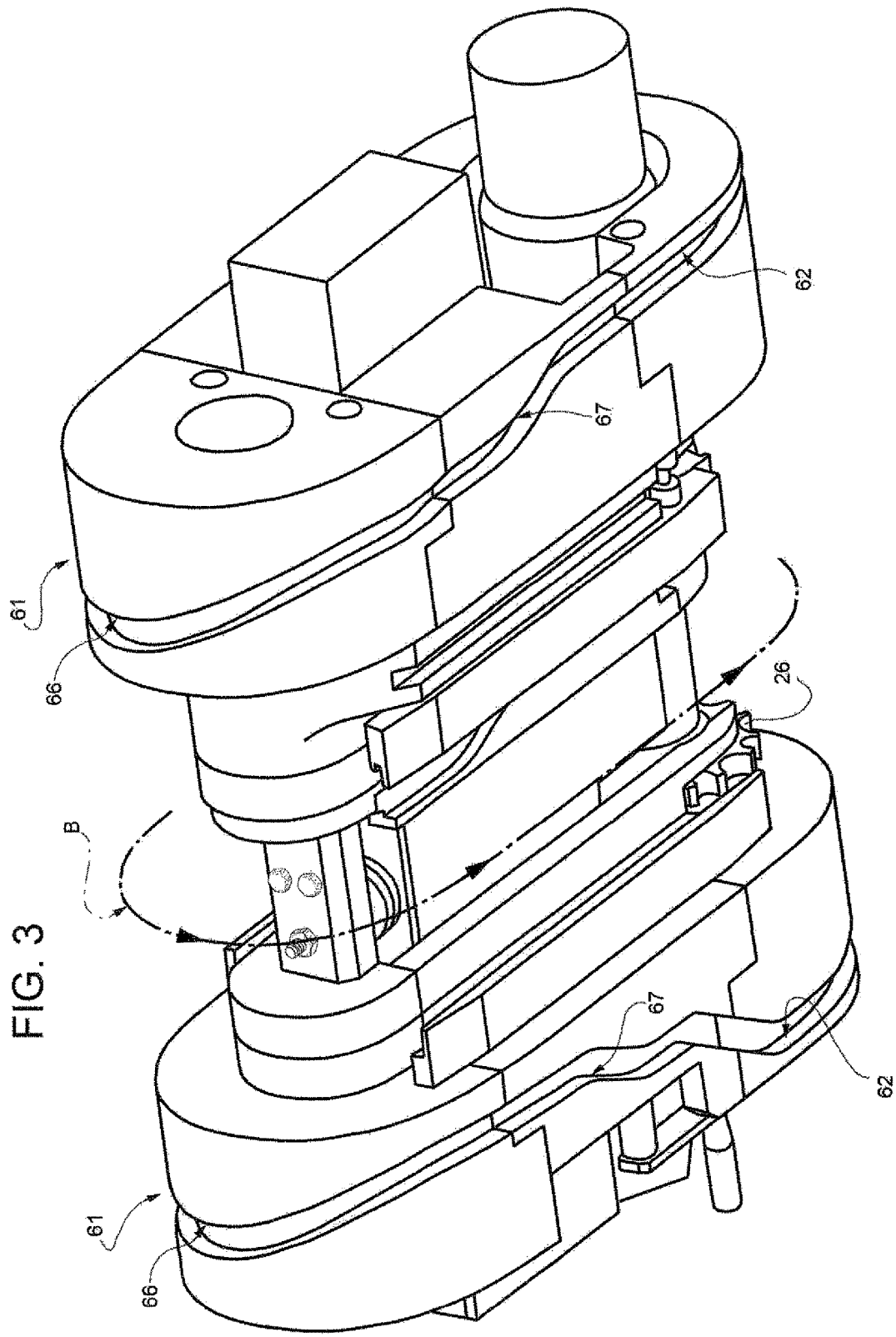
FIG. 3 shows a bottom perspective view, with parts removed for clarity, of the folding unit of FIG. 2.
Figure 4:
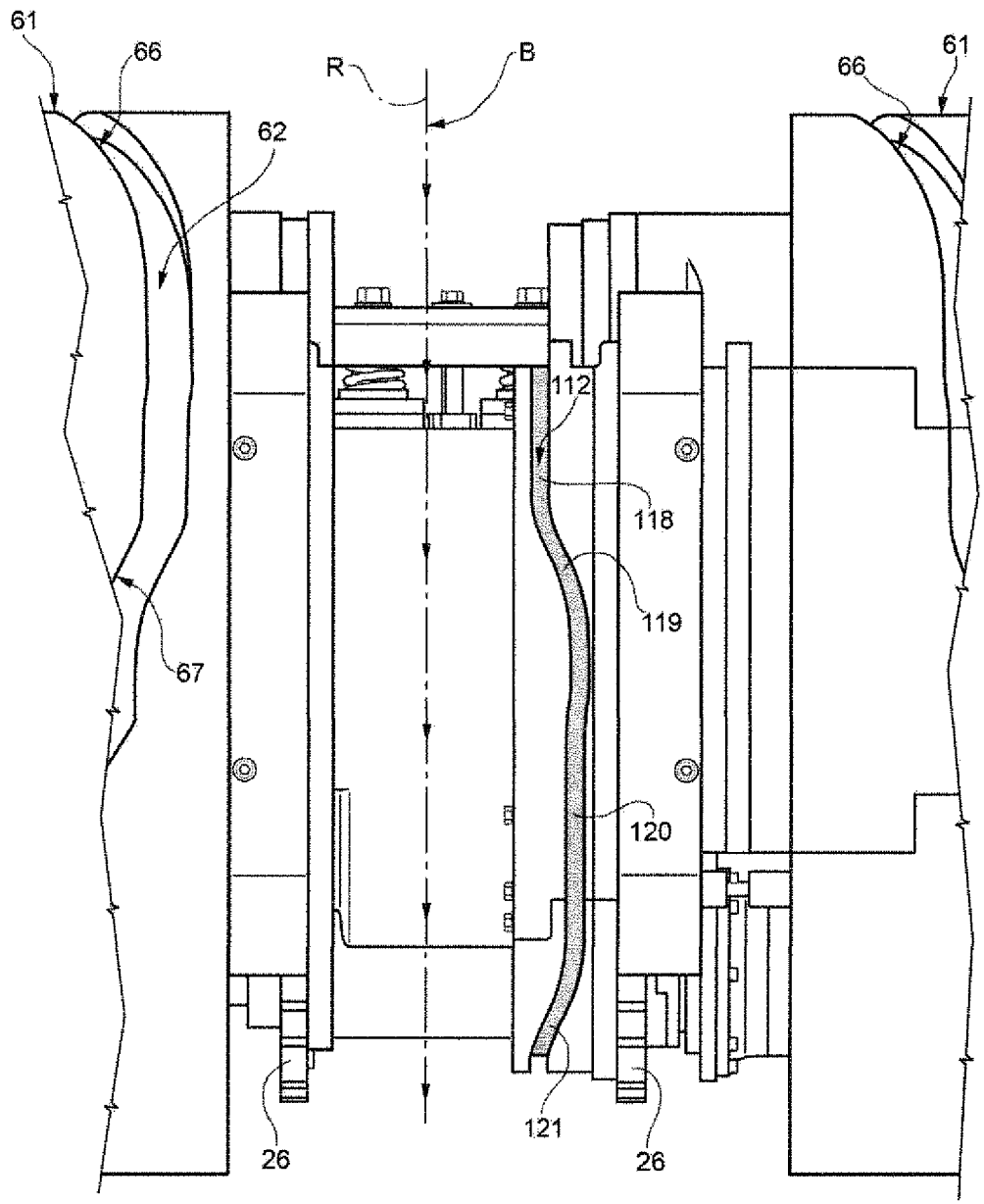
FIG. 4 shows a bottom view, with parts removed for clarity, of the folding unit of FIG. 2.

With reference to FIGS. 3 to 5, grooves 62 comprise, proceeding from station 21 to station 22:

relative straight portions 63 which are adapted to keep shells 50 of each pair in the open position;

relative converging portions 64 which are adapted to move shells 50 from relative open to relative fully closed portion along stretch P2 of path P;

relative straight portions 65 which are adapted to keep shells 50 of each pair in respective fully closed position;

relative curved portions 66 which are adapted to integrally move shells 50 with respect to paddle 43 and parallel to respective directions C; relative curved portions 66 also move shells 50 from respective fully closed to respective closed positions; and relative curved portions 67 which are adapted to move shells 50 from respective closed to respective open positions.

Folding means 23 comprise a guide member 45 fitted in a fixed position between station 21 and heating device 27 (FIG. 1).

Guide member 45 defines a contrast surface 46 (FIG. 1) converging towards chain 60 and cooperating in a sliding manner with end portion 9 of each pack 3 to compress and flatten end portion 9 towards chain 60.

Frame 29 also comprises a pair of fixed sides 68 (only one shown in FIG. 1) for laterally containing packs 3 along path B, located on opposite sides of chain 60, and extending between station 21 and heating device 27.

Heating device 27 comprises (FIGS. 1, 8, 9 and 10):
an assembly air device 69 fitted to frame 29;
a pair of first nozzles 70 connected to assembly 69 and adapted to direct hot air onto flaps 20 of each pack 3 before each pack 3 reaches final pressing device 28; and
a pair of second nozzles 71 connected to assembly 69 and adapted to direct hot air onto flaps 19 of each pack 3 before a relative pair of shells 50 reaches the fully closed position.

Pressure device 28 comprises (FIG. 1) a belt 80 wound onto a drive wheel 81 and a driven wheel 82. Belt 80 comprises, on its outer surface opposite to wheels 81, 82, a plurality of projections 83 which are adapted to press flaps 19 of each pack 3 onto relative fin 17.

The volume of each package 2 in formation is controlled, downstream from heating device 27, within a compartment bounded by:
paddles 43 of relative link 35 and of the link 35 arranged immediately downstream proceeding according to the advancing direction of chain 60;
shells 50 of relative link 35 which are arranged in the fully closed position; and
plate 72 of relative link 35 arranged in the second position; and
belt 80.

Advantageously, with particular reference to FIGS. 11, 12, 13 and 18, each link 35 further comprises a rotating element 100 mounted in a rotatable manner onto the relative plate 36 to produce a change of orientation of the relative package 2 about its axis A before releasing such package 2 at the station 22.

In particular, the rotating element 100 of each link 35 comprises a disk-shaped portion 101 arranged into a seat 102 formed in the relative plate 36, and a pair of protruding flaps 103 extending from diametrically opposite edge portions of the disk-shaped portion 101 and adapted to cooperate with the relative package 2 to produce rotation thereof.

More specifically, plate 36 and disk-shaped portion 101 of rotating element 100 of each link 35 have respective receiving surfaces 104, 105, which are flush with one another, extend parallel to the advancing direction of packs 3 and packages 2 and are adapted to cooperate, in use, with packs 3 and packages 2, respectively. The angular movement of each rotating element 100, preferably equal to 90°, with respect to the relative plate 36 occurs about an axis E orthogonal to surfaces 104, 105 and coaxial with the axis of the relative disk-shaped portion 101 and with axis A of the relative package 2 when centered on the rotating element 100.

As clearly visible in FIGS. 7, 15, 16, 17 and 18, in the embodiment shown, each rotating element 100 is arranged on a lateral zone 106 of the contoured portion 38 of the relative plate 36, so that the relative package 2 engages the rotating element 100 only at the end of portion Q and along portion R of path B, wherein the corresponding pair of shells 50 is maintained in the closed position and staggered from the relative paddle 43 along direction C.

More specifically, along portion Q of path B, the shells 50 of each link 35 move to the closed position and parallel to direction C with respect to the relative paddle 43 as a result of interaction of the corresponding rollers 55 with curved portions 66 of grooves 62. At the end of portion Q of path B, the shells 50 of each link 35 are set in the closed position and at the opposite sides of the relative rotating element 100 so as to maintain the relative package 2 centered on such rotating element 100.

In the condition in which each package 2 is received on a relative rotating element 100, the corresponding protruding flaps 103 are positioned downstream and upstream of the relative link 35 so as to not interfere with the lateral motion of the corresponding shells 50 parallel to direction C (see FIG. 11); each package 2 is engaged between the protruding flaps 103 of the relative rotating element 100 with a given play so as to avoid any interference with the lateral insertion motion of the package 2 parallel to direction C.

As clearly visible in FIGS. 13 to 17, flaps 103 of each link 35 diverge from one another starting from the relative disk-shaped portion 101.

With particular reference to FIGS. 11, 12, 13 and 18, the angular movement of each rotating element 100 is produced by actuating means 108 carried by the relative link 35 and which can be selectively activated at a given stretch of portion R of path B.

In particular, actuating means 108 of each link are carried by a supporting body 109 projecting from a side of the relative plate 36 and rotating element 100 opposite to the surfaces 104, 105. Actuating means 108 of each link 35 comprise a crankshaft 110 carried by supporting body 109 in a rotatable manner about axis E, angularly coupled to the relative rotating element 100 and provided with a cam follower roller 111 cooperating with a fixed cam profile 112 (FIG. 4) formed on the bottom portion of frame 29 of unit 1.

More specifically, each crankshaft 110 comprises a shaft 113 of axis E, engaging a through hole 114 of the relative supporting body 109 in an axially fixed position and in a rotatable manner about its axis E, and a crank 115 radially projecting from shaft 113 and provided with cam follower roller 111. In greater detail, shaft 113 of each link 35 has one end portion 117 secured to the disk-shaped portion 101 of the relative rotating element 100 and an opposite end portion 116, projecting externally from the relative supporting body 109 and connected to crank 115.

With reference to FIG. 4 and proceeding along portion R of path B, cam profile 112 comprises:
a straight portion 118 parallel to portion R and adapted to keep each rotating element 100 with its flaps 103 positioned downstream and upstream of the relative link 35;
a sloping portion 119 adapted to produce rotation of each rotating element 100 about axis E so as to change orientation of the relative package 2 and to set the relative flaps 103 at the opposite sides of such package 2;
a substantially straight portion 120 parallel to, and spaced from, straight portion 118; and
a sloping portion 121 having an inclination opposite to the one of sloping portion 119 and adapted to restore each rotating element 100 in the initial position.

As visible in FIG. 4, straight portion 120 of cam profile 112 is farther than straight portion 118 from the centre line of unit 1 parallel to portion R of path B.

Operation of unit 1 will be described with reference to one pack 3 and to relative link 35 as of an initial instant, in which pack 3 is fed from the in-feed conveyor to chain 60 at station 21 of path B.

In this condition, link 35 is moving at the beginning of stretch P1 and therefore slot 40 is open. Furthermore, shells 50 are arranged into the open position.

In detail, pack 3 is positioned with end fin 18 facing plate 72 of link 35, and slides on one wall 10*a* along relative paddle 43, so that fin 18 is parallel to paddle 43, until when fin 18 enters open slot 40.

In this condition, pack 3 is arranged above and, therefore, supported by plate 36 of link 35.

As link 35 moves along stretch P1 and a portion of stretch P2, contrast surface 46 cooperates in a sliding manner with end portion 8 of pack 3. In this way, portions 8 and 9 are flattened towards each other, fin 17 is folded onto portion 8 and flaps 20 are bent relative to portion 8 towards axis A and on the opposite side of portion 8, as shown in FIG. 10.

At the same time, each pair of consecutive links 35 moves towards each other along stretch P1. In this way, racks 76 of the subsequent link 35 are thrust by toothed sectors 73 of the precedent link 35, proceeding according to the advancing direction of chain 60 along stretch P1 of forming path B.

Accordingly, plate 72 of the subsequent link 35 moves from the second to the first position, in which it engages slot 40.

As plate 72 engages slot 40, fin 18 is folded onto end portion 9. Simultaneously, wedges 75 raise flaps 20 towards end portion 8 and bend flaps 20 relative to axis A, as shown in FIGS. 9 and 10.

As link 35 moves along stretch P2, shells 50 move from the open position to the fully closed position and plates 72 are arranged in the second position.

Before shells 50 reach pack 3, nozzles 70, 71 direct air onto flaps 19, 20 of pack 3, to partly and locally melt the packaging material of flaps 19, 20 (FIG. 10).

Immediately after, shells 50 contact walls 10*b*, 11 of packs 3, and press flaps 20 onto relative top stretches 14 of walls 11 as flaps 20 cool. In this condition, shells 50 are arranged in the fully closed position.

Subsequently, pack 3 is arranged below belt 80 and projections 83 press flaps 20 onto portion 9, as flaps 20 cool.

In this condition, the volume of folded package is controlled by two paddles 43 of respective consecutive links 35, by shells 50 arranged in the fully closed position, and by projections 83 of belt 80.

Folded package 2 then move along portion Q of path P.

Along portion Q, shells 50 move relative to each other from the fully closed position to the closed position, in which they grip package 2 but substantially do not exert any pressure thereon.

Furthermore, along portion Q, shells 50 move together with package 2 relative to paddle 43 parallel to direction C and towards the relative rotating element 100.

In this way, at the end of portion Q, shells 50 together with folded package 2 are staggered from paddle 43 and are arranged at the opposite sides of the rotating element 100 so as to maintain the package 2 centered on the rotating element 100 (FIG. 11); in this condition, the protruding flaps 103 are positioned downstream and upstream of the package 2.

Along portion Q, each pair of consecutive links 35 move away from each other. In this way, racks 76 of the subsequent link 35 move away from toothed sectors 73 of the precedent link 35.

Accordingly, plate 72 of the subsequent link 35 moves back from the second to the first position, in which it leaves free slot 40.

Finally, folded package 2 and shells 50 arranged in the closed position are conveyed along portion R.

It is important to mention that during the descending stretch of portion Q and along portion R of path B, folded package 2 is arranged below plate 36 and is supported by the shells 50 arranged in the closed position.

At a certain point of portion R of path B, shells 50 move back to the open position and package 2 falls, under the gravity action, onto the out-feed conveyor 42, located below unit 1 and moving at the same speed as conveyor 34. It is worth to note that the fall is of some millimeters only.

In this condition, the cam follower roller 111 cooperates with straight portion 118 of cam profile 112; as the cam follower roller 111 starts to contact sloping portion 119 of cam profile 112, the crankshaft 110 begins to rotate about axis E so producing a corresponding angular movement of rotating element 100.

Due to the polygonal profile of the package 2, the turning movement of the rotating element 100 about axis E produces impact of the flaps 103 on the package 2 so rotating the latter about its axis A while it rests on the out-feed conveyor 42.

Rotation of package 2 ends when cam follower roller 111 leaves sloping portion 119 of cam profile 112 and prosecutes along straight portion 120.

In this condition, the flaps 103 are placed at the opposite sides of package 2 and at a little distance from it; in this way, package 2 is completely released from unit 1 and can prosecute its travel on out-feed conveyor 42.

It should be noted that, being staggered relative to shells 50 and package 2, paddle 43 does not interfere with the release of package 2.

Subsequently, the cam follower roller 111 cooperates with sloping portion 121 of cam profile 112 so as to move back the rotating element 100 to the initial position.

The advantages of the present invention will be clear from the foregoing description.

In particular, thanks to the fact that each link 35 of the conveyor 34 is provided with a rotating element 100 adapted to produce rotation of the relative package 2 about its axis A, the packages 2 can be released to the following handling unit (in the present case the out-feed conveyor 42) in the desired orientation and step between one another.

In this way, there is no need of a transfer unit between folding unit 1 and the following handling unit, with consequent improvement of the production line performances and of the package forming.

In addition, the package rotation is obtained without any motor but simply through a cam system (cam profile 112 and cam follower rollers 111).

Clearly, changes may be made to unit 1 and to conveyor 34 without, however, departing from the protective scope defined in the accompanying Claims.

The invention claimed is:

1. A conveyor for an article handling unit, said conveyor comprising an endless transport element fed with a plurality of articles at an input station and advancing said articles along a handling path to an output station;
   wherein said transport element is formed by a plurality of modules, each comprising a supporting member adapted to receive in use a relative article to be handled;
   wherein each module further comprises a rotating element mounted in a rotatable manner onto the supporting member to produce a change of orientation of the relative article before releasing the article at said output station; and the supporting member and the rotating element of each module possessing respective article receiving surfaces which are flush with one another, and the rotating element of each module being configured to rotate with respect to the relative supporting member about an axis orthogonal to the relative article receiving surfaces.

2. The conveyor as claimed in claim 1, wherein it further comprises at least one driving wheel and at least one idler element; and wherein said transport element is looped about said driving wheel and said idler element.

3. The conveyor as claimed in claim 1, wherein said modules are linked to one another.

4. The conveyor as claimed in claim 1, wherein said modules are hinged to one another.

5. The conveyor as claimed in claim 1, wherein the rotating element of each module comprises at least a pair of protruding flaps adapted to cooperate with the relative article to produce rotation thereof.

6. The conveyor as claimed in claim 1, wherein each module further comprises actuating means which can be selectively activated to rotate the relative rotating element with respect to the relative supporting member.

7. The conveyor as claimed in claim 6, wherein the actuating means of each module comprise a cam follower cooperating with fixed cam means as said module advances along said handling path.

8. The conveyor as claimed in claim 7, wherein the actuating means of each module comprise a crankshaft angularly coupled to the relative rotating element, mounted in a rotatable manner with respect to the relative supporting member and carrying the relative cam follower.

9. The conveyor as claimed in claim 1, wherein the rotating element of each module is arranged on a lateral portion of the relative supporting member, and wherein moving means are provided to displace each article onto the relative rotating element as the relative module advances along said handling path.

10. The conveyor as claimed in claim 1, wherein it comprises, for each module, one pair of shells which are integrally movable along said handling path and are movable relative to each other along a direction transversal to said handling path;

said shells of each pair being settable along said direction at least in:
a closed position, in which they grip the relative said article; and
an open position, in which they are detached from the corresponding said article.

11. The conveyor as claimed in claim 1, wherein said transport element comprises:
a top branch along which said supporting members are arranged below the relative articles; and
a bottom branch defining said output station and along which said articles are overturned and arranged below the respective supporting members.

12. The conveyor as claimed in claim 10, wherein the actuating means of each module are activated when the relative said shells are in the open position.

13. The conveyor as claimed in claim 9, wherein, for each module, said moving means are defined by the relative pair of shells movable together in said closed position along said direction towards the relative rotating element.

14. A unit for handling articles, comprising:
a conveyor as claimed in claim 1 and which is fed with a plurality of packages; and
folding means for performing at least one folding operation on said packages.

15. A conveyor for an article handling unit, comprising:
an endless transport element configured to be fed with a plurality of articles at an input station and configured to advance the articles along a handling path to an output station;
the transport element including a plurality of modules;
each module comprising a supporting member configured to receive a relative article to be handled during operation of the conveyor;
each module further comprising a rotating element mounted in a rotatable manner onto the supporting member to produce a change of orientation of the relative article before releasing the article at the output station; and
the supporting member of each module possessing a first article receiving surface, and the rotating element of each module possessing a second article receiving surface, the first and second article receiving surfaces of each module being flush with one another, and the rotating element of each module being configured to rotate with respect to the supporting member of the module about an axis orthogonal to the first and second article receiving surfaces of the module.

16. The conveyor as claimed in claim 15, wherein the rotating element of each module comprises at least one pair of protruding flaps configured to cooperate with the relative article to produce rotation thereof during operation of the conveyor.

17. The conveyor as claimed in claim 15, wherein each module further comprises an actuator configured to be selectively activated to rotate the relative rotating element with respect to the relative supporting member during operation of the conveyor.

18. The conveyor as claimed in claim 17, wherein the actuator of each module comprises a cam follower cooperating with a fixed cam profile as the module advances along the handling path.

\* \* \* \* \*